United States Patent
Akenine-Möller et al.

(10) Patent No.: US 8,285,063 B2
(45) Date of Patent: Oct. 9, 2012

(54) MULTI-MODE VECTOR-BASED IMAGE PROCESSING

(75) Inventors: Tomas Akenine-Möller, Lund (SE); Jacob Munkberg, Malmö (SE); Jacob Ström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 454 days.

(21) Appl. No.: 12/522,736

(22) PCT Filed: Mar. 31, 2008

(86) PCT No.: PCT/SE2008/050375
§ 371 (c)(1),
(2), (4) Date: Jul. 10, 2009

(87) PCT Pub. No.: WO2008/123825
PCT Pub. Date: Oct. 16, 2008

(65) Prior Publication Data
US 2010/0014766 A1   Jan. 21, 2010

Related U.S. Application Data

(60) Provisional application No. 60/907,492, filed on Apr. 4, 2007.

(51) Int. Cl.
*G06K 9/36* (2006.01)
(52) U.S. Cl. .................... 382/243; 382/239
(58) Field of Classification Search .......... 382/232–253
See application file for complete search history.

(56) References Cited

U.S. PATENT DOCUMENTS

| | | | |
|---|---|---|---|
| 4,933,761 A * | 6/1990 | Murakami et al. | 375/240.22 |
| 6,415,054 B1 * | 7/2002 | Silverbrook et al. | 382/233 |
| 6,778,181 B1 | 8/2004 | Kilgariff et al. | |
| 2006/0233448 A1 * | 10/2006 | Pace et al. | 382/236 |
| 2009/0046935 A1 * | 2/2009 | Akenine-Moller et al. | 382/235 |
| 2010/0027686 A1 * | 2/2010 | Zuo et al. | 375/240.29 |

FOREIGN PATENT DOCUMENTS

| | | |
|---|---|---|
| EP | 1 321 894 | 6/2003 |
| WO | 2006/006915 | 1/2006 |

(Continued)

OTHER PUBLICATIONS

International Search Report for PCT/SE2008/050375, mailed Jul. 21, 2008.

(Continued)

*Primary Examiner* — Jingge Wu
(74) *Attorney, Agent, or Firm* — Nixon & Vanderhye P.C.

(57) ABSTRACT

A block (300) of image elements (310) is compressed by identifying a base vector (460) based on normalized feature vectors (312) of the block (300). If a position-determining coordinate (420) of the base vector (460) is present inside a defined selection section (530) of feature vector space (500), the block (300) is compressed according to a default mode and an auxiliary mode to get a default and auxiliary compressed block (600), respectively. The compressed block (600) resulting in smallest compression error is selected. If the auxiliary mode is selected, the position-determining coordinate (420) is mapped to get a mapped coordinate (425) present outside the representable normalization portion (510) of vector space (500). The auxiliary compressed block (600) comprises a representation of this mapped coordinate (425). If the default mode is selected no such coordinate mapping is performed and the default compressed block (600) instead comprises a representation of the non-mirrored coordinate (420).

24 Claims, 16 Drawing Sheets

FOREIGN PATENT DOCUMENTS

WO 2007/084062 7/2007

OTHER PUBLICATIONS

Written Opinion of the International Searching Authority for PCT/SE2008/050375, mailed Jul. 21, 2008.

Yamasaki et al., "Fast and Efficient Normal MAP Compression Based on Vector Quantization", Acoustics, Speech and signal Processing, 2006, Piscataway, NJ, USA, IEEE, ISBN 978-1-4244-0469-8.

* cited by examiner

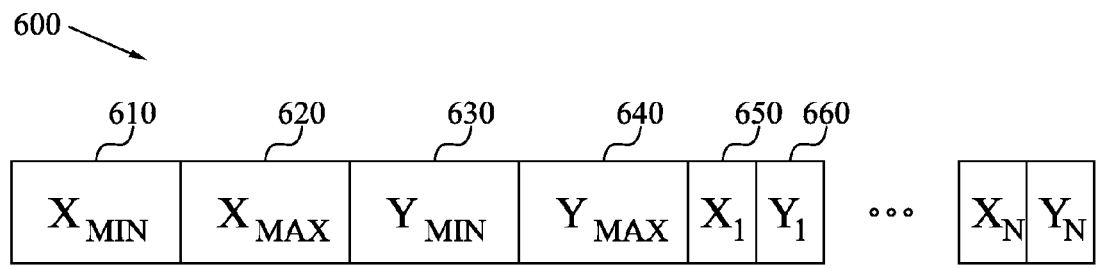
Fig. 10
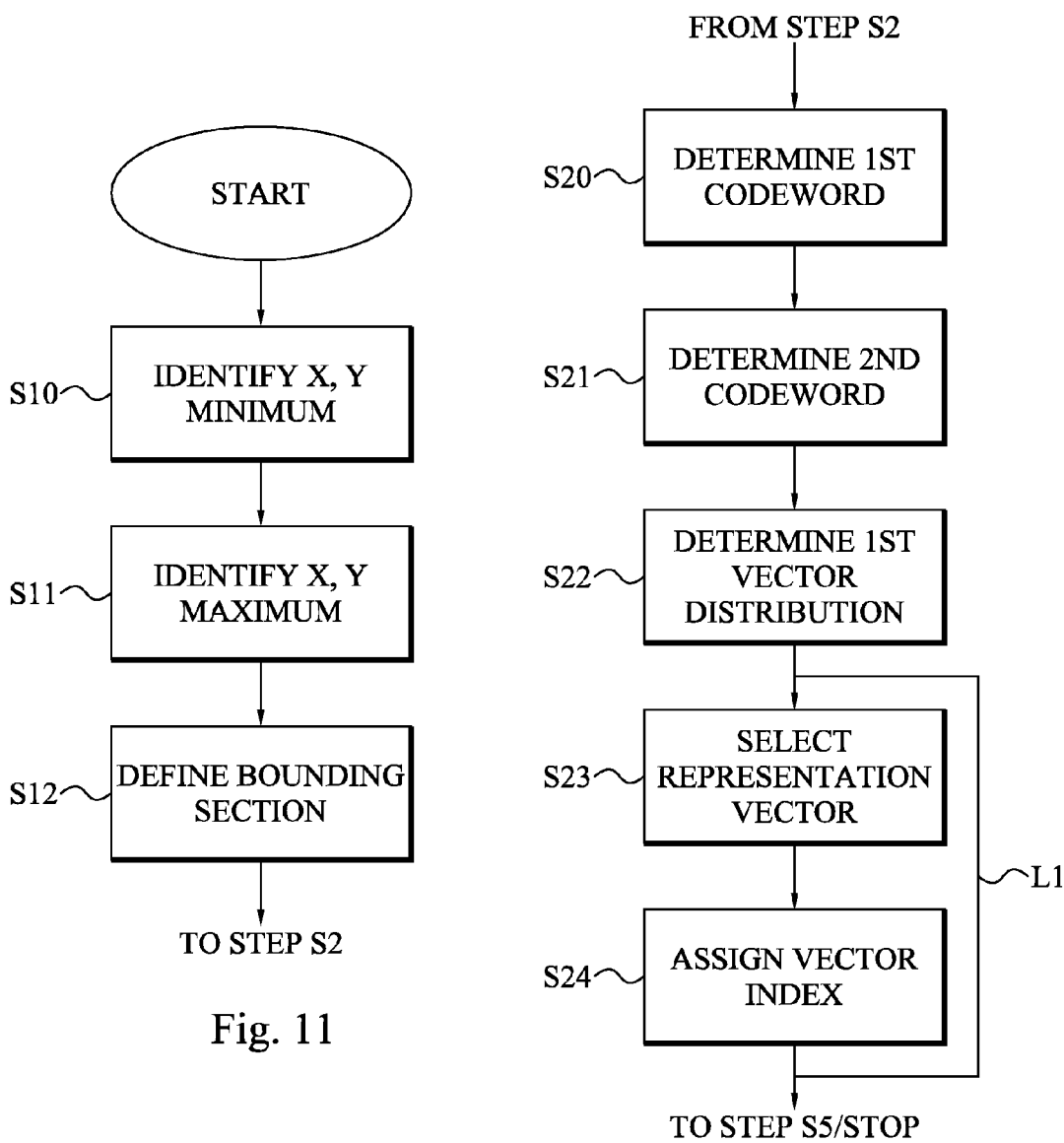
Fig. 11
Fig. 12

MULTI-MODE VECTOR-BASED IMAGE PROCESSING

This application is the U.S. national phase of International Application No. PCT/SE2008/050375, filed 31 Mar. 2008, which designated the U.S. and claims priority to U.S. Application No. 60/907,492 filed 4 Apr. 2007, the entire contents of each of which are hereby incorporated by reference.

TECHNICAL FIELD

The present invention generally relates to compressing and decoding images, and in particular to compressing and decoding blocks of feature vectors according to multiple modes.

BACKGROUND

The real-time rendering of three-dimensional graphics has a number of appealing applications on mobile terminals, including games, man-machine interfaces, messaging and m-commerce. Since three-dimensional rendering is a computationally expensive task, dedicated hardware must often be built to reach sufficient performance. Innovative ways of lowering the complexity and bandwidth usage of this hardware architecture are thus of great importance.

The main bottleneck, especially for mobile phones, is memory bandwidth. A common technique for reducing memory bandwidth usage is texture compression. Texturing refers to the process of "gluing" images (here called textures) onto the rendered triangles. If the textures are compressed in memory, and then during accessing they are decompressed, a significant amount of bandwidth usage can be avoided.

Most texture compression schemes are concentrating on image-type data, such as photographs. However, with the advent of programmable shaders, textures have started to be used for many other types of data than just traditional photographic images. Bump mapping has therefore become a widespread technique which adds the illusion of detail to geometrical objects in an inexpensive way. More specifically, a texture, called a bump map or normal map, is used at each pixel to perturb the surface normal. A common approach to generate normal maps is to start with a high polygon count model and create a low complexity model using some geometrical simplification algorithm. The "difference" between these two models is then "baked" into a normal map. For real-time rendering, the normal map is applied to the low complexity model, giving it a more detailed appearance. For instance, the document [1] shows how it is possible to go from a very high triangle-count model (15 000 polygons) to a very low one (1 000 polygons) with preserved quality by using normal maps.

To be able to use lower polygon-count models is of course very attractive for mobile devices and terminals, since they have lower computational performance than PC systems.

In the majority of cases today, bump mapping is performed in local tangent space (X, Y, Z), of each rendering primitive, e.g. a triangle. Since the length of the normal is not of interest, unit normals can be employed. Thus, the problem is to compress triplets (X,Y,Z), where $X^2+Y^2+Z^2=1$. The simplest scheme, is just to treat X,Y,Z as RGB (Red, Green, Blue) and compress it with S3TC/DXT1 [2], but that gives rather bad quality.

Actually, for smooth surfaces it turns out that even uncompressed RGB888/XYZ888 does not give enough quality for some objects. Especially for smooth surfaces, more than eight bits are needed. Therefore ATI Technologies developed 3Dc [1], which is a compression format that will often allow higher quality than XYZ888.

In 3Dc only X and Y are compressed, and Z is calculated using equation 1:

$$Z=\sqrt{1-X^2-Y^2} \qquad (1)$$

X and Y are compressed separately. The X-values are grouped into blocks of 4×4 pixels. These values can range from −127.000 to +127.000, (or alternatively, from 0 to 255), but they are often clustered in an interval. 3Dc takes advantage of this and specifies this value using 16 bits: eight bits for the start of the interval and eight bits for the end of the interval.

Inside this interval, each value is specified using 3 bits each. This means that eight reconstruction levels within the interval are possible. The reconstruction levels are always equispaced (evenly spaced), reflecting an assumption that the distribution inside the interval is often close to uniform.

The prior art normal compression schemes and other compression schemes handling normalized vectors has an inefficient utilization of the available bit combinations that potentially could be used for representing compressed blocks.

SUMMARY

The present invention overcomes these and other drawbacks of the prior art arrangements.

It is a general object of the present invention to provide efficient block encoding/compressing and block decoding/decompressing methods and systems.

This and other objects are met by the invention as defined by the accompanying patent claims.

Briefly, the present invention involves image processing in the form of compressing (encoding) an image and decompressing (decoding) a compressed (encoded) image.

According to the invention, an image to be compressed is decomposed into a number of blocks comprising multiple image elements (pixels, texture elements, texels, or volume elements, voxels). Each image element in a block is characterized by a normalized feature vector. The image blocks are then compressed.

As a consequence of the vector normalization, the normalized feature vectors can only occupy vector component values in a normalization sub-region of vector space. The present invention utilizes this condition for allowing the introduction of multiple different block compression/decompression modes without the need for explicit mode signaling.

The block compression comprises identifying a base vector in the normalization sub-region of feature vector space based on at least a portion of the normalized feature vectors in the block.

A position-determining coordinate of the base vector is identified and investigated to determine whether it is present in a defined selection section of the normalization sub-region. If present outside of that region the block is compressed according to a default compression mode. However, if the coordinate is inside the selection section the block is compressed both according to the default mode and an auxiliary compression mode. The two modes provide different distributions of normalized representation vectors at least partly based on the base vector. One of the available compression modes is selected for the current blocks based on respective default and auxiliary compression errors.

If the auxiliary mode is selected the position-determining coordinate is mapped or transformed to get a mapped position-determining coordinate present outside of the normalization sub-region. The auxiliary compressed block then comprises a representation (codeword) of the mapped position-determining coordinate. However, if the default mode is instead selected, no mapping of this coordinate is performed and the default compressed block instead comprises a representation (codeword) of the position-determining coordinate.

In the decoding or decompression of a compressed block, a codeword of the compressed block is retrieved. An investigation whether a first position-determining coordinate represented by the codeword is present outside of the normalization sub-region of feature vector space is performed. If present inside the normalization sub-region, the compressed block is decoded according to a default mode based on the position-determining coordinate.

However, if the position-determining coordinate is present outside of the sub-region, the coordinate is mapped or inverse transformed to get a mapped position-determining coordinate present in the normalization sub-region. The compressed block is then decoded according to an auxiliary mode based on the mapped position-determining coordinate.

The present invention also relates to a block compressor and decoder having means and units for performing the compression and decoding method, respectively.

The invention allows the introduction of at least one additional block processing scheme to a default processing scheme operating on normalized feature vectors. This provides the possibility of having a choice between different compressed block representations for at least some of the blocks and thereby an improved compression and image quality. The introduction of the additional mode(s) furthermore does not require any explicit mode signaling in the compressed block. In clear contrast, the fact that the vectors are normalized is exploited to provide an implicit signaling of the different modes without wasting any bits of the compressed blocks as mode bits.

Other advantages offered by the present invention will be appreciated upon reading of the below description of the embodiments of the invention.

SHORT DESCRIPTION OF THE DRAWINGS

The invention together with further objects and advantages thereof, may best be understood by making reference to the following description taken together with the accompanying drawings, in which:

FIG. 10 illustrates a possible layout of a compressed block according to an embodiment of the present invention;

FIG. 11 is a flow diagram illustrating an embodiment of the bounding section identifying method of FIG. 1;

FIG. 12 is a flow diagram illustrating an embodiment of the default coding step of FIG. 1;

DETAILED DESCRIPTION

Figure 1:
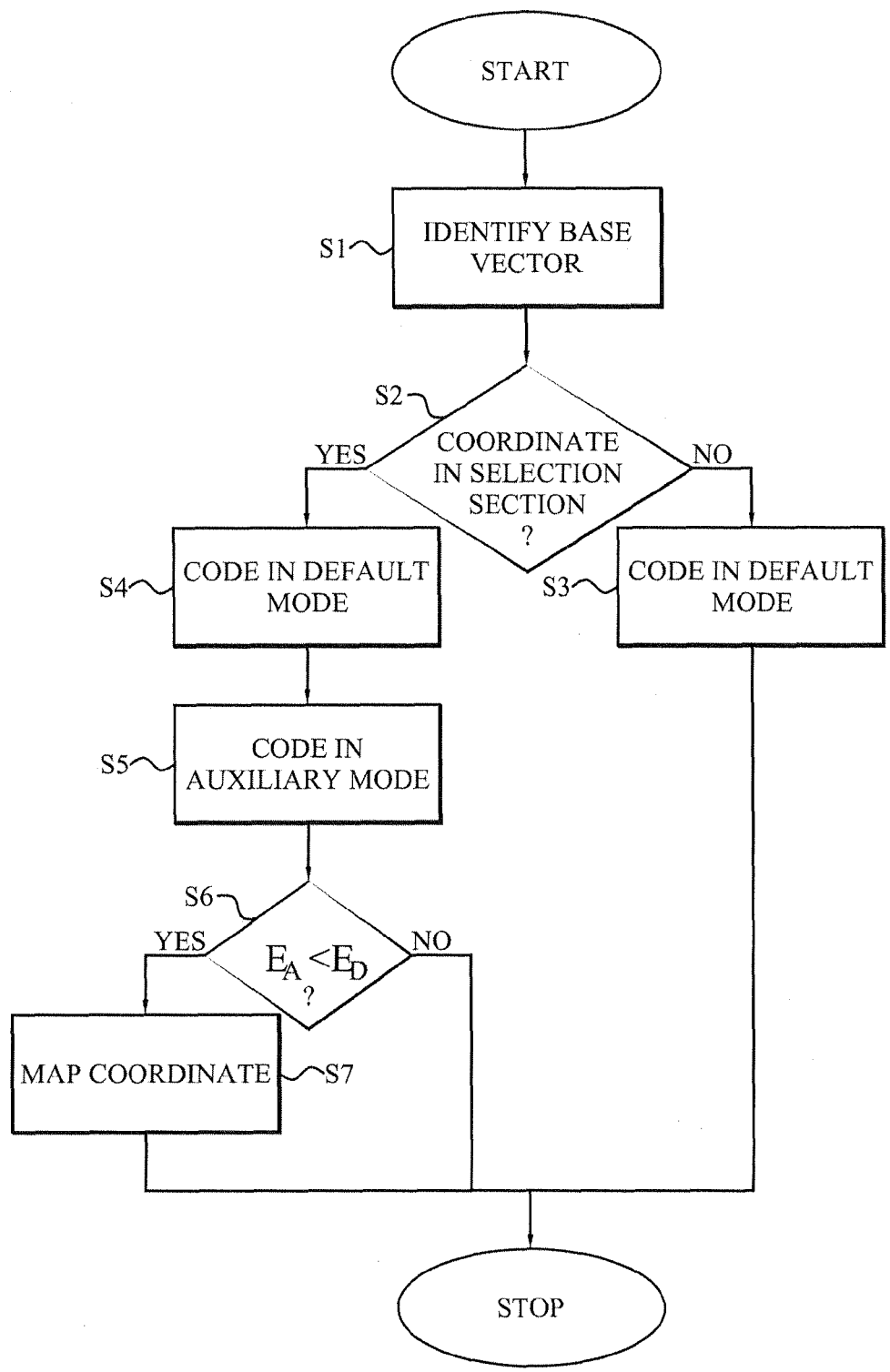
FIG. 1 is a flow diagram illustrating a method of compressing an image element block according to an embodiment of the present invention.

Throughout the drawings, the same reference characters will be used for corresponding or similar elements.

The present invention relates to image and graphic processing, and in particular to encoding or compressing images and blocks and decoding or decompressing encoded (compressed) images and blocks.

Generally, according to the invention, during image compression, an image is decomposed or divided into a number of blocks or tiles. Each such block then comprises multiple image elements having certain image element associated properties or features. The blocks are compressed to generate a compressed representation of the image.

When an encoded image or graphic primitive subsequently is to be rendered, e.g. displayed on a screen, the relevant image elements of the compressed blocks are identified and decompressed. These decompressed image elements are then used to generate a decompressed representation of the original image or graphics primitive.

The present invention is well adapted for usage with three-dimensional (3D) graphics, such as games, 3D maps and scenes, 3D messages, e.g. animated messages, screen savers, man-machine interfaces (MMIs), etc., but is not limited thereto. Thus, the invention could also be employed for compressing other types of images or graphics, e.g. one-dimensional (1D), two-dimensional (2D) or 3D images.

The invention is in particular suitable for handling bump or normal maps, or images. As is well-known in the art, a normal or surface normal denotes a 3D vector which is perpendicular to the surface (for a flat surface) or perpendicular to the tangent plane of the surface (for a non-flat surface).

In the present invention the expression "image element" refers to an element in a block or compressed representation of a block. This block, in turn, corresponds to a portion of an image or texture. Thus, according to the invention, an image element could be a texel (texture element) of a (1D, 2D, 3D) texture, a pixel of a (1D or 2D) image or a voxel (volume element) of a 3D image. Generally, an image element is characterized by certain image-element properties or features. In the present invention, each image element has a feature vector representing a feature associated with the image elements. This feature could control or influence the appearance of an image element. A preferred embodiment of such a feature vector is a surface normal, more preferably a normalized surface normal. Such a surface normal has three vector components or coordinates, i.e. X-, Y- and Z-components. However, it is generally enough to only specify two of the normal coordinates, such as X- and Y-coordinates per image element, as the remaining coordinate can be calculated therefrom, such as using equation 1 above.

Furthermore, in the following, the term "image" is used to denote any 1D, 2D or 3D image or texture that can be encoded and decoded by means of the present invention, including but not limited to bump maps, normal maps, photos, game type textures, text, drawings, high dynamic range images and textures, etc.

The present invention provides an image processing that is in particular suitable for compressing and decompressing images and blocks, where each image element has a two-dimensional normalized feature vector. In a preferred implementation of the invention, the two vector components represent two coordinates of a normalized surface normal, such as the X- and Y-coordinates (or X- and Z-coordinates or Y- and Z-coordinates). In the following, the invention is described in connection with a normalized feature vector comprising an X component and a Y component. However, this should merely be seen as an illustrative example as any other combination of two of the X, Y, Z components could instead be used.

The prior art normal compression schemes handles normalized, unit normals, i.e. the normals have a unit length:

$$X^2+Y^2+Z^2=1 \quad (2)$$

Figure 3:
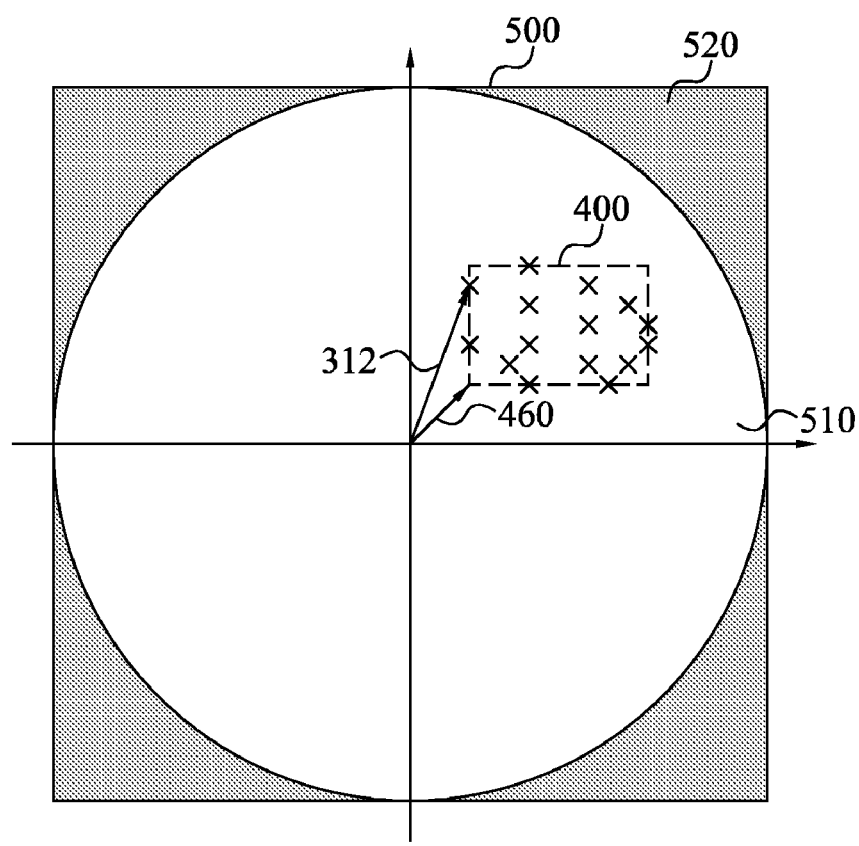
FIG. 3 is an illustration of feature vector space and normalization sub-region of the feature vector space.

This means that the X, Y coordinates will always lie inside the unit circle, which means that $X^2+Y^2 \leq 1$. The reason for this is that otherwise the Z component will be imaginary, which is not physically possible. However, due to normalization the X, Y coordinates have the potential of having values in the interval $-1 \leq X, Y \leq 1$. This means that a compressed representation of a vector component must be able to represent vector component values corresponding to the interval $[-1, 1]$. This area 500 defined by $-1 \leq X \leq 1$ and $-1 \leq Y \leq 1$ in vector space is illustrated in FIG. 3. However, the allowed region for X, Y components corresponds to the area of the unit circle 510 (in two dimensions, corresponds to the volume inside the unit sphere in three dimensions). This region occupies only $$100 \times \frac{\pi}{4} = 78.5\%$$

of the square 500. As a consequence, only 78.5% of the possible bit combinations that are possible are indeed employed in the prior art techniques for representing compressed blocks. The present invention takes advantage of this fact and provides a solution applied to blocks having normalized feature vectors for the purpose of more efficiently utilizing the available bit combinations.

Compression/Coding

Figure 2:
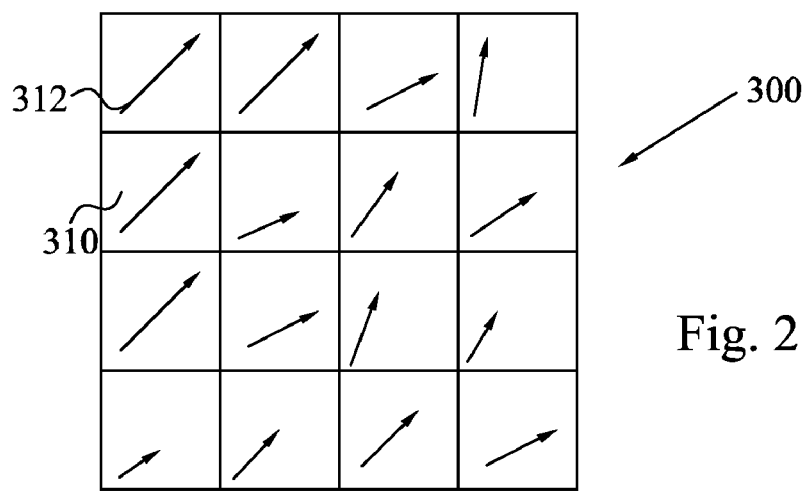
FIG. 2 is a schematic illustration of a block of multiple image elements according to an embodiment of the present invention.

FIG. 1 illustrates a (lossy) method of compressing an image according to an aspect of the invention. The image is decomposed or divided into a number of blocks. Each such block comprises multiple, i.e. at least two, image elements. In a preferred embodiment of the invention, a block comprises sixteen image elements (pixels, texels or voxels) and has a size of $2^m \times 2^n$ image elements, where $m=4-n$ and $n=0, 1, 2, 3, 4$. More preferably, m and n are both 2. It could also be possible to utilize an block of size $2^m \times 2^n$ or $2^m \times 2^n 2^p$ image elements, where m, n, p are zero or positive integers with the proviso that not all of m, n, p may simultaneously be zero. FIG. 2 schematically illustrates an example of a block 300 with sixteen image elements 310 according to the present invention. The figure also schematically illustrates the different normalized feature vectors or normals 312 associated with the image elements 310.

Step S1 identifies a base vector in a normalized sub-region of feature vector space. This vector identification is performed based on at least a portion of the normalized feature vectors of the block. FIG. 3 illustrates an example of this situation. Feature vector space 500 is in the present case defined by the square in the figure defined by $-a \leq X \leq a$ and $-a \leq Y \leq a$, where a is the value used in the normalization. In a typical implementation $a=1$. The normalization sub-region 510 is illustrated as the area (volume) of a circle (sphere) 510 in feature vector space 500. This sub-region 510 encompasses those feature vectors 312 that are achievable due to the vector normalization, i.e. those vectors 312 for which the vector components meet the requirement $X^2+Y^2 \leq a^2$. Only one of the feature vectors 312 is shown in the figure, while remaining feature vectors are indicated by their respective end points. The identified base vector 460 is also illustrated in the figure. This base vector 460 can, as is illustrated in the figure, point towards a position-determining coordinate of a bounding section 400, preferably in the form of a parallelogram and more particularly an axis-aligned, right-angled parallelogram (square or rectangle) in the normalization sub-region 510.

As is seen in the figure the bounding section 400 encompasses at least a portion, preferably all, normalized feature vectors 312 of the block. Furthermore, this bounding section 400 is intended to encompass multiple normalized representation vectors that are employed for representing the normalized feature vectors 312, which is described further herein.

A next step S2 investigates whether a position-determining coordinate of the identified base vector is present in a defined selection section of feature vector space. The position-determining coordinate corresponds to the end point to which the base vector points in the feature vector space.

Figure 4:
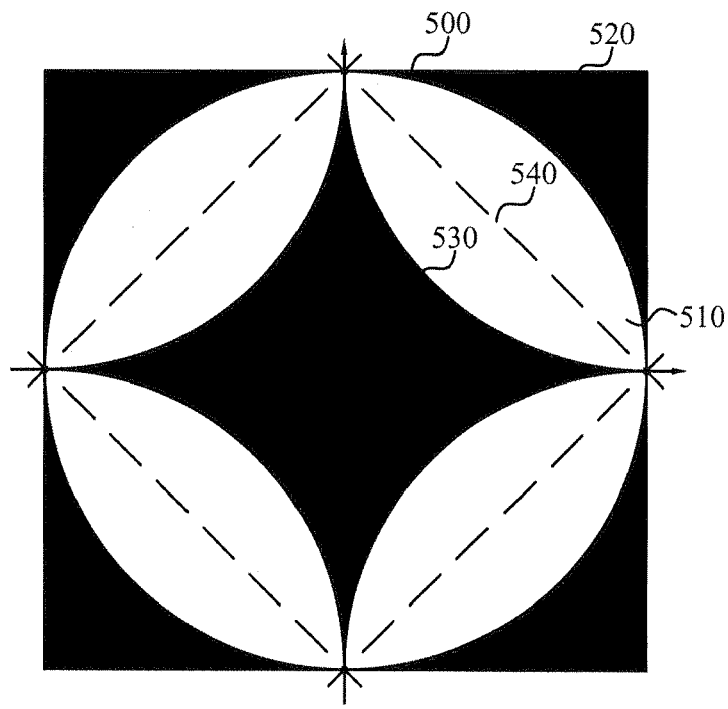
FIGS. 4 to 7 illustrate different embodiments of defining selection sections of feature vector space.

The selection section of feature vector space could correspond to the difference of feature vector space and the normalization sub-region mapped into the normalization sub-region. FIG. 4 illustrates this concept in more detail. The portion 520 of vector space corresponding to the difference between feature vector space 500 and the normalization sub-region 510 is marked in gray in the figure. This portion 520, actually four sub-portions with one in each quadrant, is mapped into the normalization sub-region 510 to form a selection sub-section 530 marked in gray in the figure. Any region mapping or transform that maps/transforms the portion 520, or at least a sub-portion thereof, into a selection sub-section 530 present in the normalization sub-region 510 can be used according to the present invention. A typical mapping or transforming function that can be used according to the present invention is to fold or mirror the portion 520 into the normalization sub-region 510 to form the selection sub-section 530. In such a case, the mirroring of the sub-portion in the first quadrant is preferably performed relative the mirror line 540 defined as:

$$x+y-a=0 \quad 0 \leq x \leq a, \ 0 \leq y \leq a \quad (3)$$

where x is the first vector component and y is the second vector component. The corresponding mirror lines 540 for the second to fourth quadrants are defined as:
Second quadrant: $-x+y-a=0 \ -a \leq x \leq 0, \ 0 \leq y \leq a$
Third quadrant: $-x-y-a=0 \ -a \leq x \leq 0, \ -a \leq y \leq 0$
Fourth quadrant: $x-y-a=0 \ 0 \leq x \leq a, \ -a \leq y \leq 0$ These mirror lines 540 are illustrated as dashed lines in the figure.

The selection section 530 in FIG. 4 is defined by:

$$(x-a)^2+(y-a)^2 > a^2 \quad 0 \leq x \leq a, \ 0 \leq y \leq a$$

$$(x+a)^2+(y-a)^2 > a^2 \quad -a \leq x \leq 0, \ 0 \leq y \leq a$$

$$(x+a)^2+(y+a)^2 > a^2 \quad -a \leq x \leq 0, \ -a \leq y \leq 0$$

$$(x-a)^2+(y+a)^2 > a^2 \quad 0 \leq x \leq a, \ -a \leq y \leq 0$$

Figure 5:
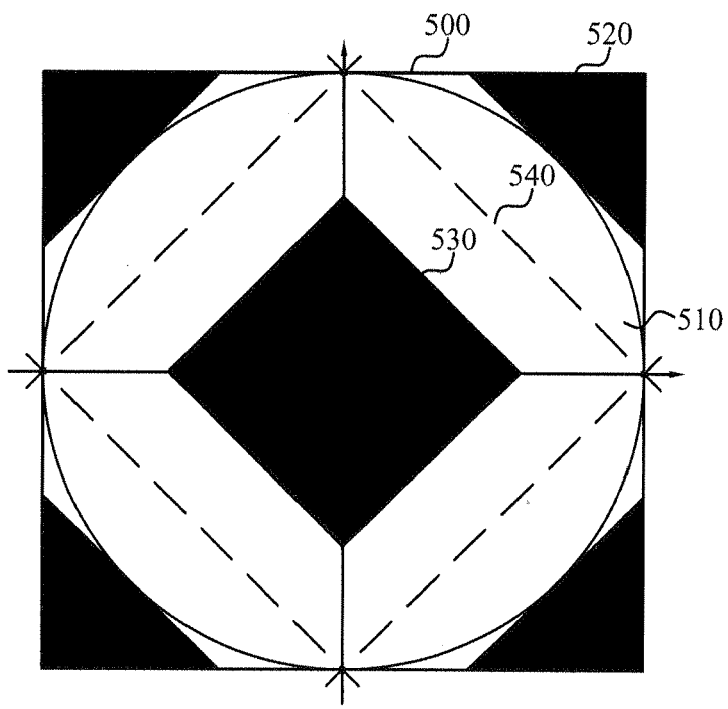

Usage of this selection section 530 means that 100% of the feature vector space 500 can be utilized in the vector compression. However, this requires the calculation of squared expressions, i.e. $x^2$ and $y^2$. If this is considered to be too expensive, an alternative selection section 530 can be used as is illustrated in FIG. 5. In this case an isosceles triangle 520 is defined, in the first quadrant, by the intersection of the lines $x=a$, $y=a$ and $x+y-a\sqrt{2}=0$. The corresponding lines for the three other quadrants are:
Second quadrant: $x=-a$, $y=a$ and $-x+y-a\sqrt{2}=0$
Third quadrant: $x=-a$, $y=-a$ and $-x-y-a\sqrt{2}=0$
Fourth quadrant: $x=a$, $y=-a$ and $x-y-a\sqrt{2}=0$ When these isosceles triangles 520 are mirrored into the normalized sub-region 510 of feature vector space 500 along the mirror lines 540 indicated in FIG. 5 and defined above, the resulting selection section 530 is defined as:

$$x+y+a\sqrt{2}-2 < 0 \quad 0 \leq x \leq a, \ 0 \leq y \leq a$$

$$-x+y+a\sqrt{2}-2 < 0 \quad -a \leq x \leq 0, \ 0 \leq y \leq a$$

$$-x-y+a\sqrt{2}-2 < 0 \quad -a \leq x \leq 0, \ -a \leq y \leq 0$$

$$x-y+a\sqrt{2}-2 < 0 \quad 0 \leq x \leq a, \ -a \leq y \leq 0$$

Figure 6:
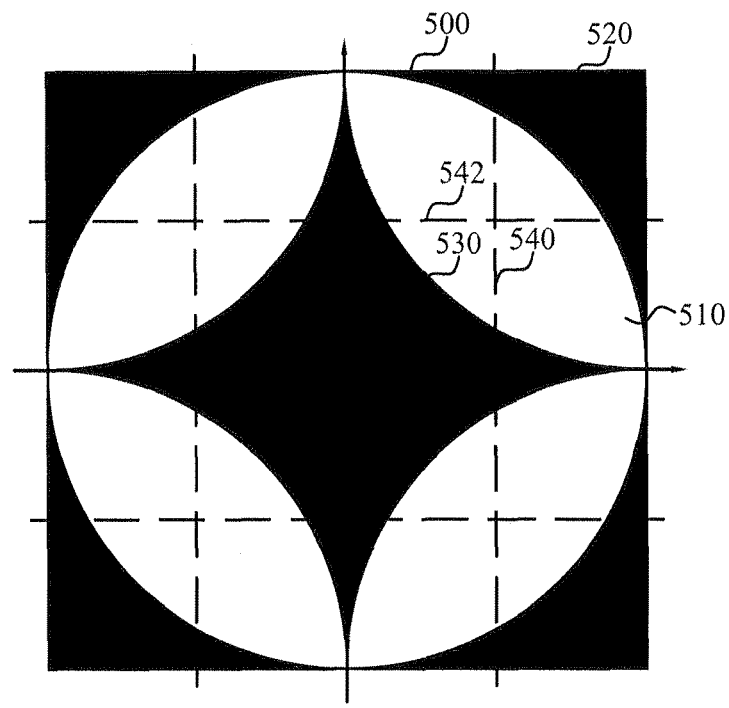

FIG. 6 illustrates the usage of another mirroring embodiment. Instead of using a single mirror line per quadrant as described above two mirror lines 540, 542 are used per quadrant. In the first quadrant the two mirror lines 540, 542 are $x=a/2$ and $y=a/2$. As a consequence, a point (x, y) present in the selection portion 530 could first be mirrored relative the mirror line 540 $x=a/2$ to get the intermediate mirror point (a-x,y). This intermediate mirror point is then mirrored relative the line 542 $y=a/2$ to get the final mirrored point (a-x, a-y) present in the portion 520 defined as the difference between feature vector space 500 and the normalization sub-region 510. The same result is obtained if first employing the mirror line 542 $y=a/2$ and then the other line 540 $x=a/2$.

In the second quadrant the mirror lines are $x=-a/2$ and $y=a/2$ and in the third quadrant $x=-a/2$ and $y=-a/2$. Finally, the lines $x=a/2$ and $y=-a/2$ are used in this embodiment as mirror lines for the fourth quadrant.

Figure 7:
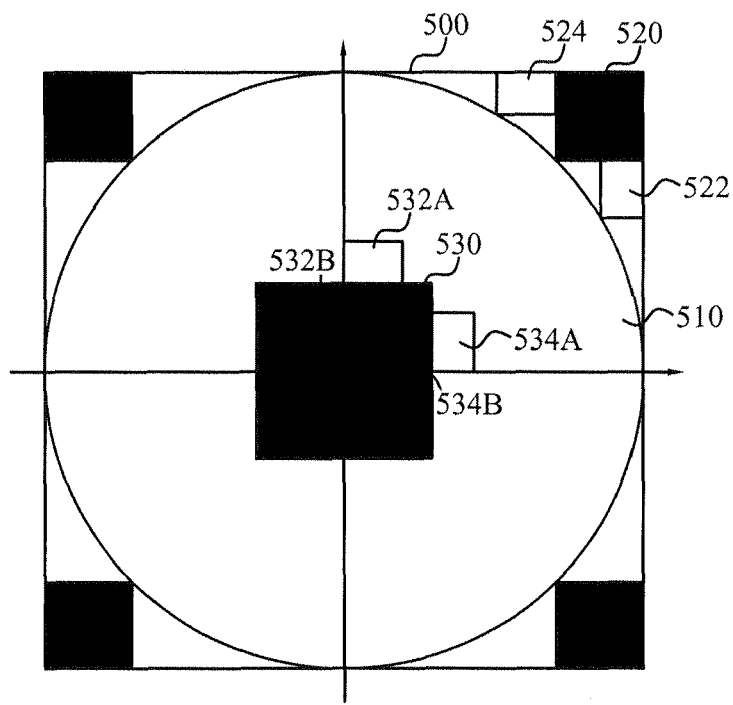

As has been mentioned in the foregoing, the coordinate or point mapping of the present invention does not necessarily have to be implemented through a coordinate mirroring as exemplified by FIGS. 4-6. Also other forms of mapping or transforming operations that maps a point present in the selection sub-region 530 to the "non-available" portion 520 of feature vector space 500 are possible. FIG. 7 illustrates an example of this situation where the selection sub-region 530 is in the form of a square having a side length of $$\left(1-\frac{1}{\sqrt{2}}\right)a.$$

A first corner of the square is positioned at (0,0), while the diagonally opposite corner is positioned, in the first quadrant, at $$\left(\left(1-\frac{1}{\sqrt{2}}\right)a, \left(1-\frac{1}{\sqrt{2}}\right)a\right).$$

The mapping of a point present in the selection sub-region 530 out to a corresponding "non-available" region 520 present in space defined as the difference between vector feature space 500 and the normalization sub-region 510 can then be performed, in the first quadrant, by the following transformation:

$$(x, y) \rightarrow \left(x+\frac{a}{\sqrt{2}}, y+\frac{a}{\sqrt{2}}\right)$$

This means that a point present in the lower left (upper right) corner of the square 530 will be transformed to the lower left (upper right) corner of the square 520 present outside of the normalization sub-region. The same discussion applies mutatis mutandis to the other three quadrants.

FIG. 7 also hints that several squares 520 and/or rectangles 522, 524 can be used to cover as large portion of the non-available space portion $x^2+y^2 > a^2$ as possible. These extra rectangles/squares 522, 524 can then be mapped to corresponding areas 532A, 534A inside $x^2+y^2 \leq a^2$ to thereby increase the selection section area 530, 532A, 534A. It is expected that most feature vectors will have vector components that are closer to zero than closer to the maximum normalization value a. As a consequence, it will be advantageous to provide a large part of the selection section 530, 532A, 534A close to origin. In this example, the first rectangular selection portion 532A can therefore be aligned along the top edge of the square 530 and with the second rectangular selection portion 534A aligned with the right square edge as indicated in the figure. This means that a coordinate present in the selection square 530 is mapped, if the auxiliary mode is employed, to a coordinate present in the square 520. Correspondingly, a coordinate present in the first selection rectangle 532A (second selection rectangle 534A) is mapped, in the auxiliary mode, to a coordinate in the first rectangle 522 (second rectangle 522) present in the space portion $x^2+y^2 > a^2$.

It is actually possible to have overlapping selection portions as indicated by the alternative positions of the rectangles 532B, 534B. In such a case, if a position-determining coordinate of the base vector is present in the square selection section 530 but outside of the two central rectangular selection sections 532B, 532B a first auxiliary mode is available. If the coordinate is present inside both the square 530 and a first rectangle 532B both the first and a second auxiliary mode are available. Correspondingly, if the coordinate is positioned inside the square 530 and the second rectangle 534B a third auxiliary mode is available in addition to the first mode. All these auxiliary modes are available if the coordinate would happen to be in the area defined by the intersection of the square 530 and the two rectangles 532B, 534B.

In a preferred embodiment of the invention, the coordinate mapping or transform is a 1-to-1 transform. This means that each coordinate present in the selection section has one unique corresponding mapped coordinate in the mapped section outside of the normalization sub-region. Correspondingly, each coordinate in the mapped section can be mapped back (inverse transform) to its unique coordinate in the selection section.

If the position-determining coordinate of the base vector is inside the selection section as investigated in step S2 in FIG. 1, the method continues to step S4 where the current block is compressed according to a first or default compression mode to generate a default compressed representation of the block. In addition, the same block is also compressed according to a second or auxiliary compression mode to generate an auxiliary compressed block representation. The default compression mode preferably involves determining a first distribution of multiple normalized representation vectors which are used as coded representations of the original feature vectors in the block. Correspondingly, the auxiliary mode preferably determines a second, different distribution of multiple normalized representation vectors. The respective distributions are preferably determined at least partly based on the identified base vector.

In the figure, the default and auxiliary mode compressions have been illustrated as serial steps with first a calculation according to the default mode and then an auxiliary mode compression. This should, however, merely be seen as an illustrative example. In another embodiment, the auxiliary mode compression is first performed followed by compressing the block according to the default mode. A further possibility is to perform a parallel compression where the block, actually two instances thereof, is compressed according to the default and auxiliary mode simultaneously or nearly simultaneously.

Thus, we now have two different sets or distributions of possible normalized representation vectors that can be used as representations of the original normalized feature vectors in the block. In connection with the compression according to the default and the auxiliary mode in steps S4 and S5, a respective compression error value is calculated for the two modes. This compression error is a representation of how well the default or auxiliary compressed block represents the original block. Different such compression errors are known in the art and can be used by the invention. A typical such error measure E could be:

$$E = \sum_{i=0}^{N-1} \|\bar{r}_i - \bar{v}_i\| \quad (4)$$

where $\bar{v}_i$ is the normalized feature vector of image element i in the block and $\bar{r}_i$ is the normalized representation vector generated according the default and auxiliary mode and selected as representation of the normalized feature vector for image element i. In this case the block comprises N image elements, such as N=16.

A next step S6 selects the compression mode of the default and auxiliary mode to use for the correct block. This selection is performed based on the respective error values calculated for the default $E_D$ and auxiliary $E_A$ modes. In a preferred embodiment, the mode that resulted in the smallest compression error is selected in step S6.

In the case the default compressed block is the best representation of the original block, in the light of the employed error representations, the method ends. However, if the auxiliary mode instead results in a better compressed block representation the method continues from step S6 to step S7. Step S7 involves mapping the position-determining coordinate investigated in step S2 to form a mapped coordinate positioned in a mapped selection section being outside of the normalization sub-region. Thus, the original position-determining coordinate has coordinate values (X, Y), where $X^2+Y^2 \leq a^2$. However after the mapping or transformation the mapped or transformed coordinate has coordinate values (X', Y'), where $X'^2+Y'^2 > a^2$. As a consequence, the mapped coordinate has a combination of component values that is traditionally not allowed since it would, according to prior art compression/decompression schemes, result in physically indefinite or forbidden values.

The position-determining coordinate mapping is can be implemented as a coordinate mirroring. In such a case, the coordinate is preferably mirrored relative the above-identified mirror lines that was used for mirroring the difference between the feature vector space and the normalization sub-region into the normalization sub-region to form the selection section. This means that the mirrored selection section corresponds to the grey areas marked with reference number 520 in FIGS. 4 and 5.

An auxiliary compressed block comprises a representation or codeword of the mapped position-determining coordinate. However, a default compressed block instead comprises a representation or codeword of the position-determining coordinate, i.e. no mapping.

As no mapping is employed if the default compressed mode was selected in step S6, an implicit signaling of auxiliary compressed blocks is achieved by the present invention as for these blocks the position-determining coordinate is mapped to have coordinate component values defining a point or vector outside of the normalization sub-region of feature vector space. In clear contrast, default compressed blocks have position-determining coordinates present inside the normalization sub-region. There is therefore possible to introduce at least one auxiliary mode compression to complement the traditional default mode without sacrificing any bits in the compressed block for mode selection. As a consequence, the auxiliary mode comes for free.

If the position-determining coordinate of the base vector is not present inside the selection section (and therefore would be mapped outside of the available feature vector space, $-a \leq X \leq a$, $-a \leq Y \leq a$) only the default mode compression is available. The method therefore continues from step S2 to step S3 where the block is compressed according to the default compression mode. This step is performed in the same way as step S4.

Steps S1 to S7 are preferably repeated for all blocks provided during the image decomposing. The result is then a sequence or file of compressed blocks. However note that due to the inclusion of the auxiliary mode of the present invention some of the blocks could be compressed according to the auxiliary mode while others are compressed according to the default mode. The resulting compressed blocks could be ordered in a file from left to right and top to bottom in the same order in which they were broken down in the block decomposing. The method then ends.

The compressed image can be provided to a memory for storage therein until a subsequent rendering, e.g. display, of the image. Furthermore, the compressed image can be provided as a signal of compressed block representations to a transmitter for (wireless or wired) transmission to another unit.

As was briefly mentioned above, the base vector identified in step S1 could point towards a position-determining coordinate of a bounding section. The position-determining coordinate could be any pre-defined portion of the bounding section that allows determination of the position of the bounding section in feature vector space. A preferred example of such a coordinate in the case of a parallelogram-based bounding section is the coordinate of one of the corners of the parallelogram. Typically, the corner could be the lower left corner or the diagonally opposite corner (upper right) of a right-angled parallelogram even though any pre-defined corner could be used.

The default compression mode of the invention then preferably involves providing a first distribution of multiple normalized representation vectors encompassed by the bounding section. The auxiliary mode also provides multiple normalized representation vectors as the default mode. However, the multiple normalized representation vectors provided according to the auxiliary mode has a second different distribution in the bounding section as compared to the normalized representation vectors provided according to the default mode.

In the discussion of the compression method of the invention above, one auxiliary mode is potentially employed if a position-determining coordinate of the bounding section is inside the selection section. If the bounding section is in the form of an axis-aligned, right-angled parallelogram two position-determining coordinates can be determined. This is illustrated in FIG. 11, which is a particular embodiment of the base vector identifying step of FIG. 1. The method starts in step S10 where a smallest first vector component, such as $X_{min}$, and a smallest second vector component, such as $Y_{min}$, of the normalized feature vectors in the block is identified. A next step S11 identifies the corresponding largest first ($X_{max}$) and second ($Y_{max}$) vector components among the normalized feature vectors. In such a case, the bounding section (right-angled parallelogram) is defined in step S12 based on these largest and smallest vector components. This means that in this case all normalized feature vectors of the block are present inside or at the boundary of the bounding section. The method then continues to step S2 of FIG. 1. The base vector could then be pre-defined to point towards ($X_{min}, Y_{min}$) or ($X_{max}, Y_{max}$) as an example.

In this case the bounding section has a first position-determining coordinate ($X_{min}, Y_{min}$) and a second position-determining coordinate ($X_{max}, Y_{max}$). The investigation in step S2 could therefore involve investigating both these coordinates and see if any of them are present in the selection section. If no coordinates are in the selection section, the block is compressed according to the default mode. If any of them is present in the selection section, the block is compressed, in a first embodiment, according to both the default and the auxiliary mode. However, there is actually a possibility of utilizing multiple auxiliary modes depending on which position-determining coordinate that is present in the selection section. Thus, if ($X_{min}, Y_{min}$) is present in the selection section but not ($X_{max}, Y_{max}$) the block is compressed according to the default mode and a first auxiliary compression mode. If ($X_{max}, Y_{max}$) but not ($X_{min}, Y_{min}$) is inside the selection section the block is instead compressed according to the default and a second auxiliary compression mode. If both coordinates are within the selection section the block could be compressed according to the default, first, second and a third auxiliary mode. In such a case, no position-determining coordinate is mapped if the default mode is selected in step S6 of FIG. 1. The first position-determining coordinate ($X_{min}, Y_{min}$) is mapped if the first auxiliary mode is selected. Selection of the second mode causes a mapping of the second position-determining coordinate ($X_{max}, Y_{max}$), while if the third mode is selected both position-determining coordinates are mapped.

It is anticipated by the present invention that if the coordinate mapping is realized as a coordinate mirroring, the particular mirror line employed for the two position-determining coordinates could be the same or different, depending on in which quadrant they are present.

In this case, each of the default and the multiple auxiliary modes results in a respective and different distribution of multiple normalized representation vectors encompassed by the bounding section. This improves the coding efficiency and accuracy significantly by providing more than one way of compressing a block without having to spend dedicated mode bits for discriminating between the modes. In clear contrast, the position-determining coordinates are mapped, such as mirrored relative one of mirror lines (depending on in which quadrant the position-determining coordinates are present), to thereby achieve an implicit mode signaling.

FIG. 12 is a flow diagram illustrating an embodiment of the default compression steps S3 and S4 of FIG. 1. This default compression continues from step S2 of FIG. 1. A next step S20 determines a first codeword based on at least a portion of the normalized feature vectors in the block. This first codeword is a representation of a first position-determining coordinate of the bounding section, such as a representation of ($X_{min}, Y_{min}$). A next step S21 determines a second codeword based on at least a portion of the normalized feature vectors. The second codeword is a representation of the second position-determining coordinate of the bounding section ($X_{max}, Y_{max}$).

The next step S22 determines the first distribution of the multiple normalized representation vectors in the bounding section based on the two position-determining coordinates or based on the two codewords. A preferred embodiment involves determining the multiple representation vectors as linear combinations of the two position-determining coordinates. In a particular example embodiment, 64 normalized representation vectors are determined in step S22. In such a case, these vectors can be determined as:

$$\bar{r}_{ij} = \left(\frac{7-i}{7}X_{min} + \frac{i}{7}X_{max}, \frac{7-j}{7}Y_{min} + \frac{j}{7}Y_{max}\right)$$

where i=, . . . , 7 and j=0, . . . , 7.

A next step S23 selects, for an image element in the block, a vector among the multiple normalized representation vectors from step S22 as a representation of the normalized feature vector associated with the image element. This vector selection is further performed based on the normalized feature vector of the image element. In a typical implementation, the vector among the multiple representation vectors having end point that lies closest to the end point of the normalized feature vector is selected in step S23 as this minimizes the compression error.

A next step S24 assigns a vector identifier or index associated with the selected vector to the image element. The steps S23 and S24 are preferably repeated for each image element in the block, which is schematically illustrated by line L1. This means that in such a case each image element of the resulting compressed block has an assigned vector identifier allowing identification of a vector among the multiple representation vectors. The method then continues to step S5 of FIG. 1 or ends. The default compressed block therefore comprises the two codewords and a sequence of vector identifiers.

Figures 13, 17:
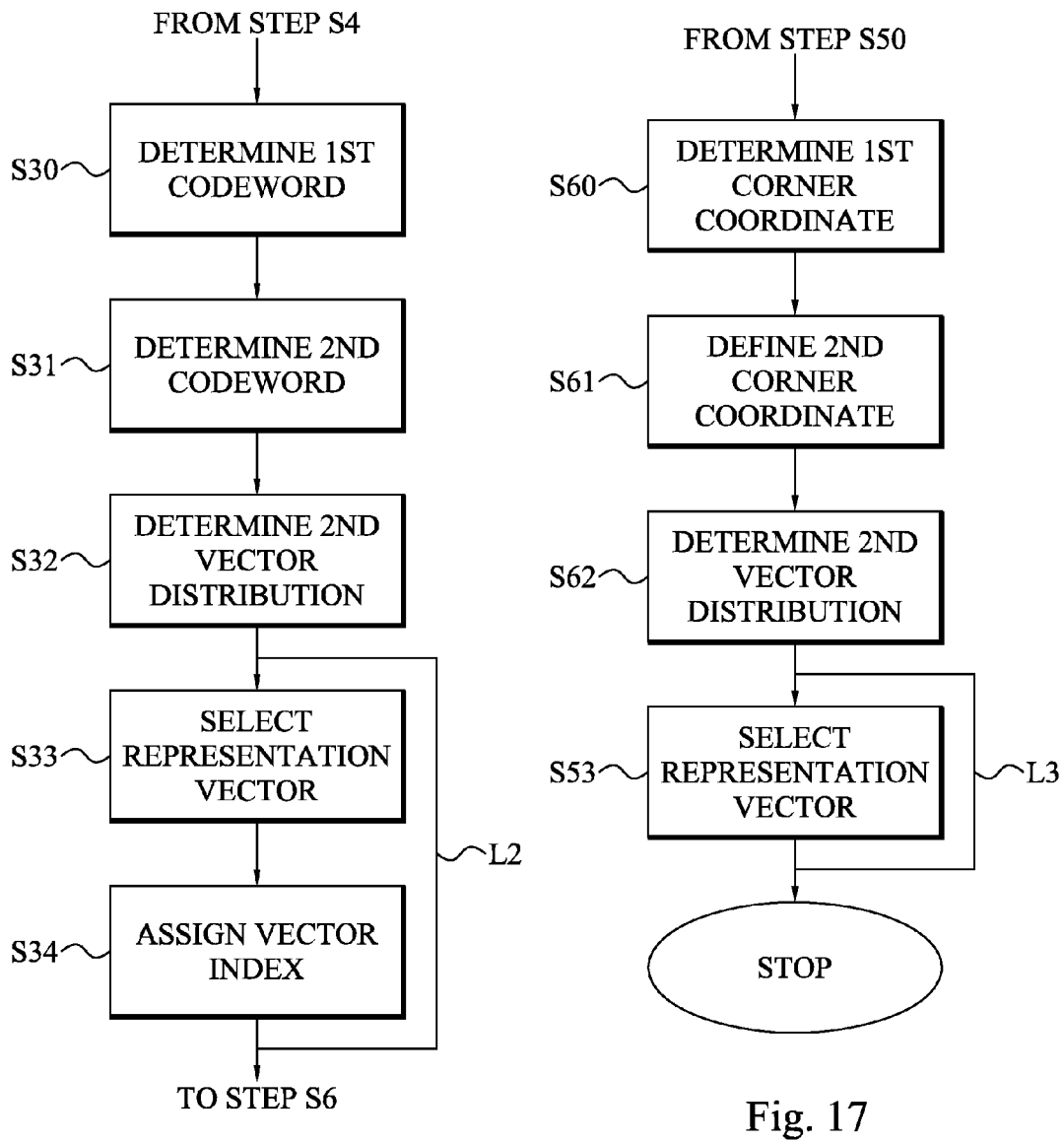
FIG. 13 is a flow diagram illustrating an embodiment of the auxiliary coding step of FIG. 1.
FIG. 17 is a flow diagram illustrating an embodiment of the auxiliary decoding step of FIG. 15.

FIG. 13 is a corresponding flow diagram illustrating a possible operation of an auxiliary compression mode. The method continues from step S4 of FIG. 1. The next step S30 determines a first codeword based on at least a portion of the normalized feature vectors. This is codeword is a representation of the mapped first position-determining coordinate, where this mapped coordinate is present outside of the normalization sub-region. The determination of step S30 involves first determining the first position-determining coordinate of the bounding section. This is performed in a substantially similar way to step S20 of FIG. 12 and is not further described. Thereafter, the position-determining coordinate is mapped to get the mapped position-determining coordinate.

The next step S31 determines a second codeword for the compressed block. This step S31 corresponds to step S21 of FIG. 12 and is performed in a similar way and is not further described.

The second distribution of normalized representation vectors is determined, in this illustrative embodiment, based on the first and second position-determining coordinates and a distance vector in step S32.

In a typical implementation this distance vector is a pre-defined distance vector having a defined length and direction in feature vector space. The distance vector can, as is further described herein, be used for achieving representation vectors having vector component values that are not representable according to the default mode. For instance and depending on the number of bits b available for each vector component the maximum achievable resolution in one dimension is $$\frac{2a}{2^b - 1}.$$

This means that a position-determining coordinate of the bounding section will not, in the default mode, have a vector component value inside the interval $$\left(k\frac{2a}{2^b - 1}, (k+1)\frac{2a}{2^b - 1}\right),$$

where k is zero or a positive integer. However, by using a distance vector having a length that is, for example, shorter than $$\frac{2a}{2^b - 1},$$

such as $$\frac{a}{2^b - 1},$$

new vector component values lying between the representable component values according to the default mode can be achieved in the auxiliary mode.

The length of distance vector is preferably pre-defined and could be equal to half the distance between two neighboring points representable in feature vector space according to the default compression mode. The direction of the distance vector is also preferably pre-defined. Examples of suitable directions that can be used according to the invention include directions parallel with the X-axis, parallel with the Y-axis, at an angle $\alpha$ relative the X-axis, such as $\alpha = \pm 45°$.

If multiple auxiliary modes are available each such auxiliary mode can have an associated distance vector. For instance, a first distance vector used in the first mode is defined as $$\left(\frac{a}{2^b - 1}, 0\right),$$

i.e. parallel with the X-axis, and the distance vector of the second mode could be $$\left(0, \frac{a}{2^b - 1}\right),$$

i.e. parallel with the Y-axis. If a third auxiliary mode is available its distance vector could be defined as $$\left(\frac{a}{2^b - 1}, \frac{a}{2^b - 1}\right) \text{ or } \left(\frac{a}{\sqrt{2}(2^b - 1)}, \frac{a}{\sqrt{2}(2^b - 1)}\right).$$

The vector determination of step S32 is preferably performed by calculating different linear combinations of a first vector comprising the distance vector plus a vector pointing towards the first position-determining coordinate and a second vector pointing towards the second position-determining coordinate. If 64 such normalized feature vectors are to be determined, a possible example of could then be:

$$\bar{r}_{ij} = \left(\frac{7-i}{7}(X_{min} - DV_x) + \frac{i}{7}X_{max}, \frac{7-j}{7}(Y_{min} - DV_y) + \frac{j}{7}Y_{max}\right)$$

where $i = 0, \ldots, 7$ and $j = 0, \ldots, 7$ and $DV_x$ is the X-component of the distance vector and $DV_y$ is the Y-component of the distance vector. In an alternative approach the distance vector is added to (subtracted from) the other position-determining coordinate/vector ($X_{max}, Y_{max}$). In still another embodiment, the distance vector is added to (subtracted from) both ($X_{min}, Y_{min}$) and ($X_{max}, Y_{max}$).

In an alternative approach the distance vector is applied to both the minimum and maximum X and/or Y value:

$$\bar{r}_{ij} = \left(\frac{7-i}{7}(X_{min} - DV_x) + \frac{i}{7}(X_{min} - DV_x), \frac{7-j}{7}Y_{min} + \frac{j}{7}Y_{max}\right)$$

This basically corresponds to moving, parallel to the X-axis, the first vector distribution to a new distribution position to obtain the second vector distribution. In the case of multiple auxiliary modes, a first mode can be a movement of the distribution parallel with the X-axis, a second mode moves the distribution parallel with the Y-axis (applies $DV_y$ to $Y_{min}$ and $Y_{max}$) and a third mode with a first movement parallel with the X-axis and then a second movement parallel with the Y-axis. The first mode is applicable if the first position-determining coordinate of the bounding section is present in the selection section, the second mode is applicable if the second position-determining coordinate is in the selection section and the third mode is used if both coordinates are in the bounding section (only default mode if none of them are in the bounding section).

The two steps S33 and S34 select normalization representation vectors for image elements in the block and assign vector indices, respectively. These two steps are performed as previously described in connection with steps S23 and S24 of FIG. 12. The two steps are preferably performed once for each image element in the block to be compressed, schematically illustrated by the line L2. The method then continues to step S6 of FIG. 12. The auxiliary compressed block comprises the two codewords and a sequence of vector identifiers.

Figure 8:
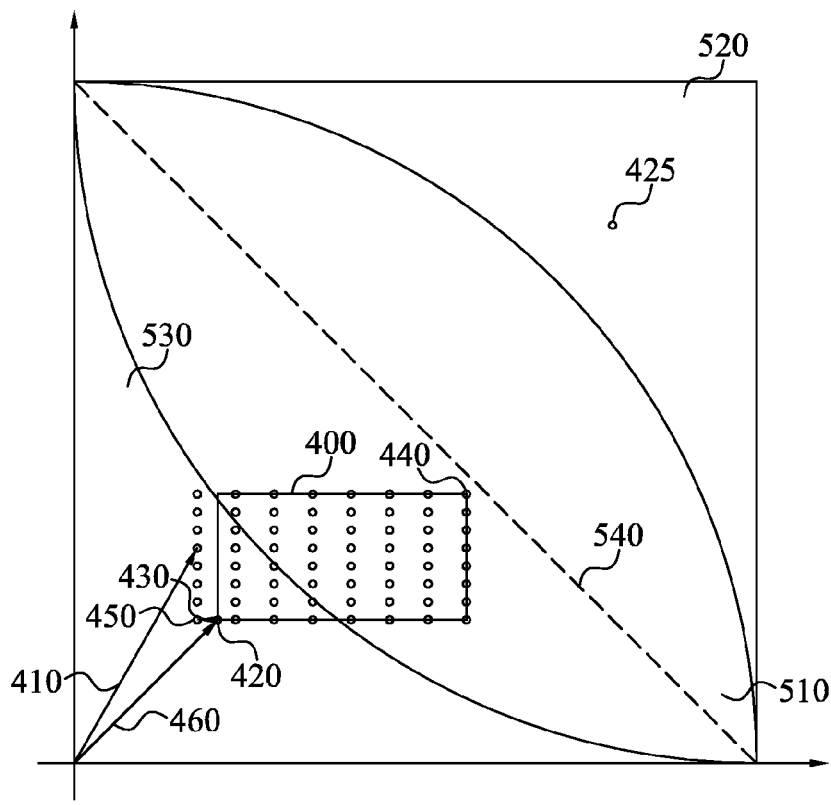
FIG. 8 is a schematic illustration of compressing a block according to an auxiliary compressing mode.
Figure 9:
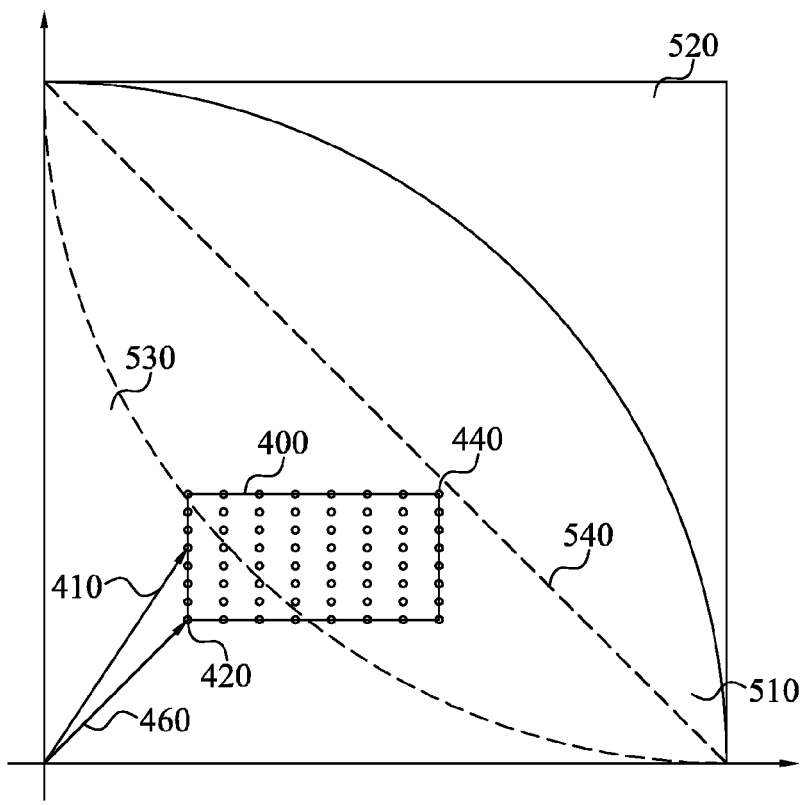
FIG. 9 is a schematic illustration of compressing a block according to a default compressing mode.

FIGS. 8 and 9 illustrate the first quadrant of feature vector space and the compression of a block according the default mode (FIG. 9) and the auxiliary mode (FIG. 8). FIG. 9 illustrates the bounding box 400 in the form of a rectangular. A first corner 420 of the rectangle is present in selection section 530, while the second diagonally opposite corner 440 is outside of the selection section 530 but in the normalization sub-region 510 of feature vector space. In the figure one normalized representation vector 410 has been explicitly indicated, while the endpoints of the other vectors are indicated by circles.

In FIG. 8 the same bounding rectangle 400 is illustrated. The figure also illustrates the distance vector 430 that is applied to, in this example, the first rectangle corner 420 to get a new coordinate 450 that is not representable according the default mode. Also in this case one of the multiple representation vectors 410 is indicated while the others have been marked with circles. Comparing the pattern or vector distribution of FIG. 8 and 7, one sees that the auxiliary mode of FIG. 8 results in a different distribution of normalized representation vectors in the bounding rectangle (even though some of the vectors fall, due to the application of the distance vector, falls outside of the boundaries of the rectangle) as compared to the default mode of FIG. 9. FIG. 8 also illustrates the mirroring of the rectangle coordinate 420 present inside the bounding section to form the mirrored coordinate 425 present outside of the normalization sub-region 510.

FIG. 10 is a schematic illustration of an embodiment of a compressed representation 600 of an image block. The compressed representation 600 comprises, in this embodiment, a first codeword 610, 630 corresponding to the components ($X_{min}$, $Y_{min}$) of the first position-determining coordinate of the bounding section (default mode) or the first mapped position-determining coordinate (auxiliary mode). The compressed block 600 also comprises the second codeword 620, 640 containing the components ($X_{max}$, $Y_{max}$) of the second position-determining coordinate of the bounding section.

The compressed block 600 also comprises the vector identifiers 650, 660, preferably one such vector identifier 650, 660 per image element of the block. In a preferred embodiment the vector identifiers 650, 660 comprises two component identifiers 650, 660, one for each (vector) component of the representation vectors.

In a typical implementation having a block layout as illustrated in FIG. 2, i.e. N in FIG. 10 is sixteen, eight bits could be spent per component 610, 620, 630, 640 of the codewords 610, 630; 620, 640. This results in, in the case of 2D base vectors, 4×8=32 bits for the codewords 610, 630; 620, 640. If each component identifier 650, 660 of the vector identifier 650, 660 comprises three bits, the total bit length of the identifier sequence is 16×2×3=96 bits. The size of the compressed representation 600 therefore becomes 32+96=128 bits.

The present invention is not limited to the particular bit layout illustrated in FIG. 10. Actually any order of the including elements, e.g. codewords 610, 630; 620, 640 and vector identifiers 650, 660, can be used. It is anticipated by the present invention that the particular compressed block layout and the including components could be dependent on which particular default and compression modes that are available and the discussion given above in connection with FIG. 10 should be seen as an illustrative non-limiting but preferred example.

The base vector identified and employed in the present invention does not necessarily have to point towards a position-determining (corner) coordinate of a bounding section (parallelogram). In another embodiment, the base vector constitutes one base vector of a set of multiple, i.e. at least two base vectors determined based on at least a portion of the normalized feature vectors in the block.

Figure 14A:
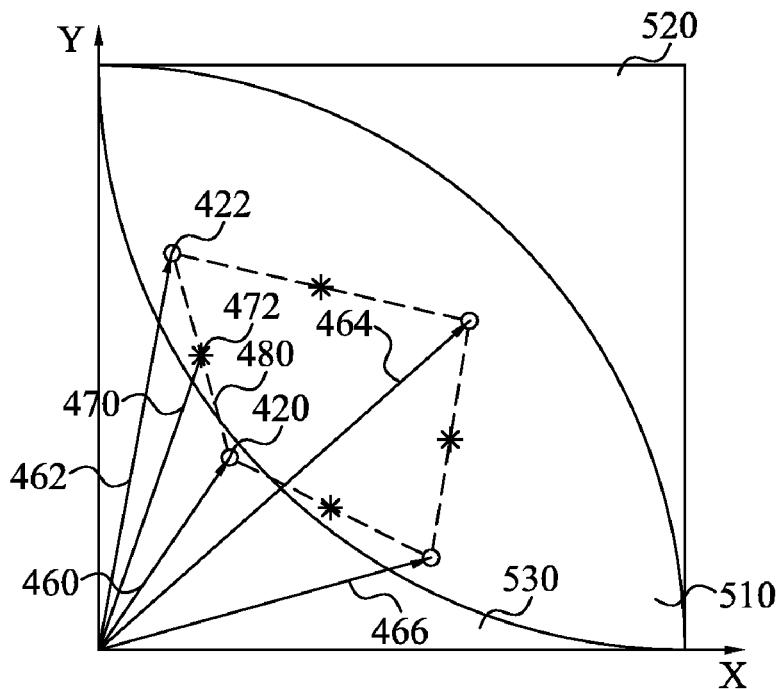
FIGS. 14A to 14D are diagrams illustrating default and auxiliary coding according to an embodiment of the present invention.

One embodiment determines a set of at least four base vectors based on at least a portion of the feature vectors in the block. However, if four base vectors are determined and these are preferably not positioned in the corners of a right-angled parallelogram in feature vector space. An order of the at least four base vectors is determined, where this order defines which base vectors that are regarded as neighboring vectors. At least one pair of neighboring base vectors as defined based on the vector order is selected. In the default compression mode, at least one additional vector is calculated based on based on this at least one selected pair of base vectors. FIG. 14A illustrates this concept. The four base vectors 460, 462, 464, 466 point towards respective end points 420, 422 depicted as circles in the figure. The order of the four base vectors 460, 462, 464, 466 is schematically illustrated by the hashed lines 480 interconnecting pairs of neighboring base vectors 460, 462, 464, 466. In this example, one additional vector 470 is calculated per neighboring vector pair and preferably as a linear combination of the two vectors. A preferred embodiment involves calculating additional vectors 470 as respective average vectors of the vector pair so that the additional vectors 470 points towards the midpoint 472 of the interconnecting lines 480.

Figure 14B:
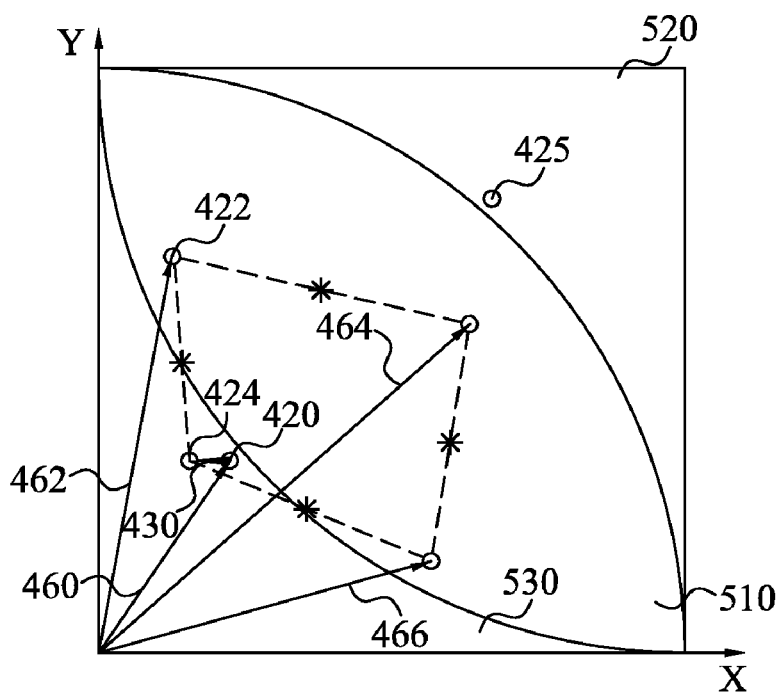

A possible auxiliary compression mode could, as previously described, add a distance vector 430 to one of the base vectors 460 to thereby obtain a moved base vector with a moved vector end point 424 as is illustrated in FIG. 14B. Due to this movement, new additional vectors are obtained for those vector pairs comprising the moved base vector. The figure also illustrates the mapping, in this case mirroring, of the position-determining coordinate 420 of one of the base vectors 460 to obtain the mirrored position-determining coordinate 425 signaling the usage of the auxiliary mode.

Figure 14C:
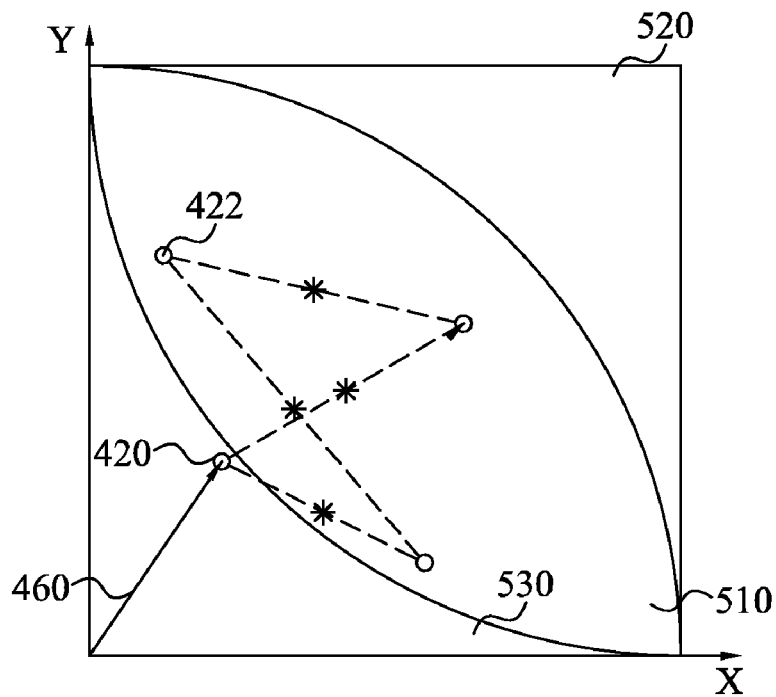
Figure 14D:
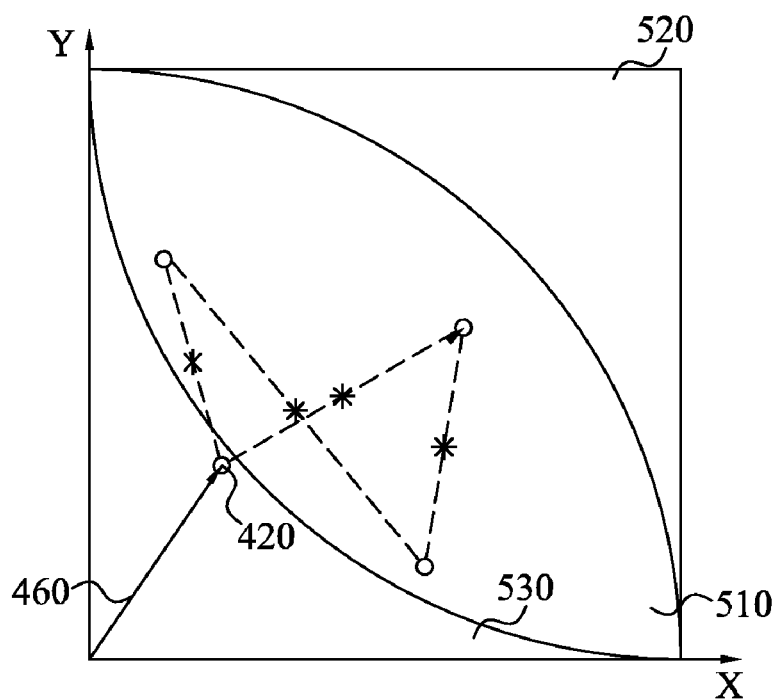

FIGS. 14C and 14D illustrate the same base vectors 460 but having a different vector order than what is illustrated in FIGS. 14A and 14B thereby achieving different additional vectors.

An image element of the block is encoded by selecting a vector among the at least four base vectors and the at least one additional vector as a representation of the feature vector of the image element. This selection is furthermore performed based on the feature vector of the image element. A vector identifier associated with the selected vector is assigned to the image element. The compressed or coded block therefore comprises representations of the at least four base vectors and a sequence of vector identifiers.

The vector order employed is preferably signaled by the particular order the respective vector representations of the base vectors are found in the compressed block, which in addition to the base vector representations also comprises the above-mentioned vector identifiers.

Another encoding or compressing embodiment comprises determining three base vectors based on at least a portion of the feature vectors in the image block. At least one additional vector is determined per pair of base vectors and based on the two base vectors of the pair. In the case the vector selection for an image element is performed among the three base vectors and the at least three additional base vectors. The vector that is the most suitable representation of the feature vector of the image element is selected and its associated vector identifier is assigned to the image element.

Decompression/Decoding

Figure 15:
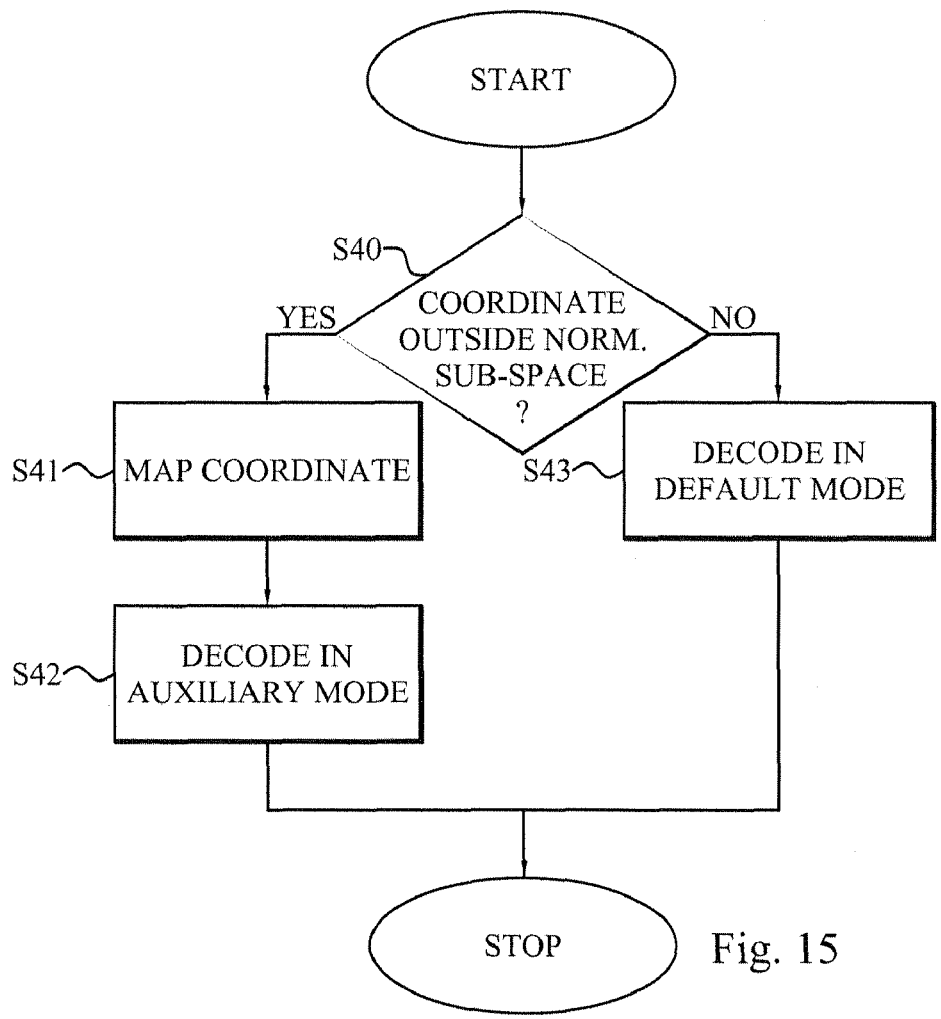
FIG. 15 is a flow diagram illustrating a method of decoding a compressed block according to an embodiment of the present invention.

FIG. 15 illustrates a flow diagram of a method of decompressing a compressed image according to the present invention. The compressed image basically comprises several compressed representations of blocks. These block representations are preferably generated by the image compressing method discussed above.

The method generally starts by identifying compressed block(s) to decompress. It could be possible that all blocks of a compressed image should be decompressed to generate a decompressed representation of the original image. Alternatively, only a portion of the original image is to be accessed. As a consequence, only a selected number of blocks have to be decompressed (or more precisely, a selected number of image elements of certain blocks have to be decoded).

Once the correct compressed block(s) is identified, step S40 investigates whether a first codeword of the compressed block represents a position-determining coordinate present outside of the normalization sub-region of feature vector space. This means that the codeword of the compressed block defines a vector or equivalent a point (coordinate) in feature vector space that has a combination of vector/coordinate components that meet the requirements $X^2+Y^2>a^2$ or some other more simple requirement as described in the foregoing so that the vector point towards an endpoint present outside of the normalization sub-region. FIG. 8 illustrates this concept with such an endpoint 425 present in the region 520 of feature vector space outside of the normalization sub-region 510.

If the coordinate is present inside the normalization sub-region, the method continues from step S40 to step S43. In this step S43 the compressed block is decoded according to a default decoding mode based on the position-determining coordinate. This default decoding mode involves determining a normalized representation vector based at least partly on the position-determining coordinate and employing the determined normalized representation vector as decoded representation of a normalized feature vector of the block.

However, if the first position-determining coordinate is present outside of the normalization sub-region the method continues to step S41 which maps or transforms, such as mirrors, the coordinate to get a mapped position-determining coordinate present in the normalization sub-regions ($X^2+Y^2 \leq a^2$).

The mapping of step S41 could be implemented as a mirroring operation, preferably performed relative the previously defined mirror lines:

$$x+y-a=0 \quad 0 \leq x \leq a, \; 0 \leq y \leq a$$

$$-x+y-a=0 \quad -a \leq x \leq 0, \; 0 \leq y \leq a$$

$$-x-y-a=0 \quad -a \leq x \leq 0, \; -a \leq y \leq 0$$

$$x-y-a=0 \quad 0 \leq x \leq a, \; -a \leq y \leq 0$$

where the particular line equation to use of the four above is defined based on in which quadrant the first position-coordinate is present.

The current compressed block is decoded in step S42 according to an auxiliary decoding mode based on the mapped position-determining coordinate. The auxiliary decoding involves calculating a normalized representation vector based at least partly on the mapped position-determining coordinate as decoded representation of the normalized feature vector of an image element in the block.

Thus, in clear contrast to the default mode where the position-determining coordinate that is directly obtainable from the codeword is employed, the auxiliary mode requires that the position-determining coordinates is first mapped to get a mapped coordinate value.

Steps S40 to S42/S43 are then preferably repeated for all blocks that comprise image elements that should be decoded. This means that the loop of steps S40 to S42/S43 could be performed once, but most often several times for different compressed blocks and/or several times for a specific compressed block. Note that for some of the compressed blocks the auxiliary decoding of steps S41 and S42 could be selected while other compressed blocks could be decoded according to the default mode depending on the actual value of the codewords in the compressed blocks.

A decompressed representation of the original image, or a portion thereof, is generated based on the decoded image elements and blocks. Note that in some applications, several image elements have to be decoded in order to render a single pixel of the decoded representation. For example, during trilinear interpolation, eight image elements are decoded and for bilinear interpolation the corresponding number is four image elements, which is well known to the person skilled in the art. The method then ends.

Figure 16:
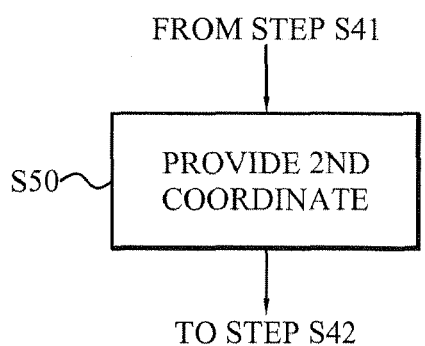
FIG. 16 is a flow diagram illustrating an additional step of the decoding method of FIG. 15.

FIG. 16 is a flow diagram illustrating an additional step of the decoding method of FIG. 15. The method continues from step S41 of FIG. 15. A next step S50 of the decoding method involves providing a second position-determining coordinate present in the normalization sub-region. This provision of step S50 is performed based on a second codeword of the compressed block. The provision of the second position-determining coordinate can be performed similar to what was described above regarding bit-sequence retrieval and optionally expansion of the first position-determining coordinate.

The method then continues to step S42 of FIG. 15, where the block is decoded in the auxiliary mode and utilize the mapped first position-determining coordinate and the second position-determining coordinate for determining the normalized representation vector(s).

FIG. 17 is a flow diagram illustrating an embodiment of the auxiliary mode decoding step S42 of FIG. 15. The method continues from step S50 of FIG. 16. A next step S60 determines a first corner coordinate of a parallelogram and more preferably an axis-aligned, right-angled parallelogram in the normalization sub-region of feature vector space. This coordinate determination is performed based on the first mapped position-determining coordinate and a distance vector. The distance vector is preferably a pre-defined vector having defined length and direction as previously described.

A next step S61 defines a second corner coordinate of the parallelogram based on the second position-determining coordinate. In a typical implementation this simply involves using the second position-determining coordinate as the second corner. This second corner coordinate is preferably a diagonally opposite corner of the parallelogram as compared to the first corner coordinate.

A second distribution of multiple normalized representation vectors encompassed by the parallelogram is determined in step S62. The vectors are determined based on the two corner coordinates and preferably as different linear combinations of the corner coordinates as mentioned in the foregoing.

The method then continues to step 563 where a vector is selected for an image element in the block and among the multiple determined normalized representation vectors. The selected vector is then employed as decoded representation of the original feature vector of the image element. The vector selection is performed based on the vector identifier or index associated with the image element and included in the compressed block, see FIG. 10.

Step S63 could be performed for several image elements in the block (schematically illustrated by line L3). It is anticipated by the invention that in some applications, only a single image element is decoded from a specific block, multiple image elements of a specific block are decoded and/or all the image elements of a specific block are decoded.

Figure 18:
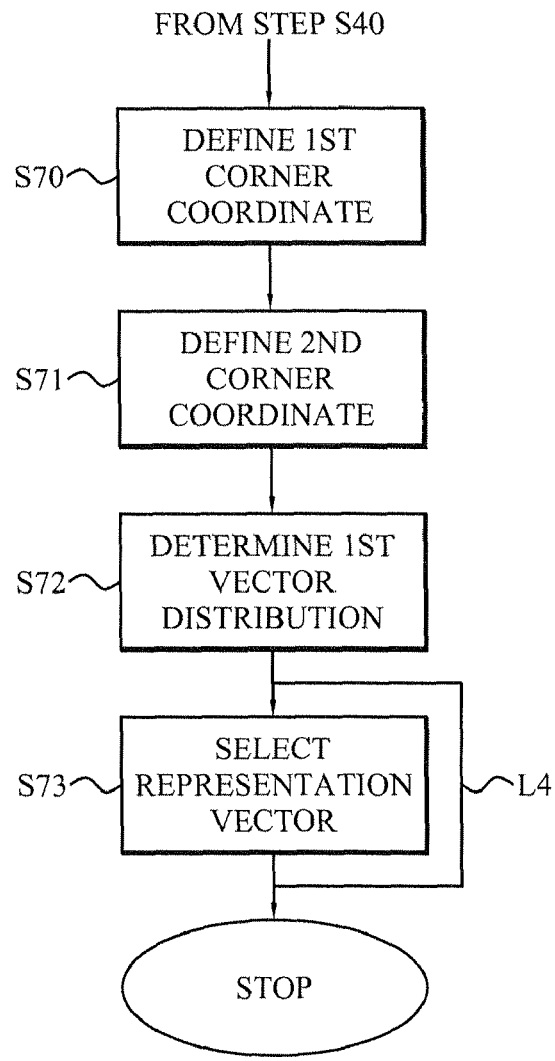
FIG. 18 is a flow diagram illustrating an embodiment of the default decoding step of FIG. 15.

FIG. 18 is a flow diagram illustrating an embodiment of the default decoding step S43 of FIG. 15. The method continues from step S40 of FIG. 15. A next step S70 defines a first corner coordinate of a parallelogram, preferably an axis-aligned, right-angled parallelogram, in the normalization sub-region of feature vector space. This corner coordinate is defined based on the first position-determining coordinate (compare with auxiliary mode that used the mapped first position-determining coordinate and a distance vector). The coordinate definition can be implemented by simply using the first position-determining coordinate directly for the corner coordinate sequence.

A next step S71 defines a second corner coordinate of the parallelogram, preferably a diagonally opposite corner as compared to the first corner coordinate. The second corner coordinate is defined based the second position-determining coordinate. This coordinate definition is performed in a similar way as the definition of the first corner coordinate based on the first position-determining coordinate in step S70.

A first distribution of multiple normalized representation vectors encompassed by the parallelogram is determined in step S72. The vector distribution is determined based on the two corner coordinates and the representation vectors are preferably determined as different linear combinations of the two corner coordinates as discussed above.

The method then continues to step S73 where a vector is selected for an image element in the block and among the multiple determined normalized representation vectors. The selected vector is then employed as decoded representation of the original feature vector of the image element. The vector selection is performed based on the vector identifier or index associated with the image element and included in the compressed block, see FIG. 10.

Step S73 could be performed for several image elements in the block (schematically illustrated by line L4). It is anticipated by the invention that in some applications, only a single image element is decoded from a specific block, multiple image elements of a specific block are decoded and/or all the image elements of a specific block are decoded.

Figure 19:
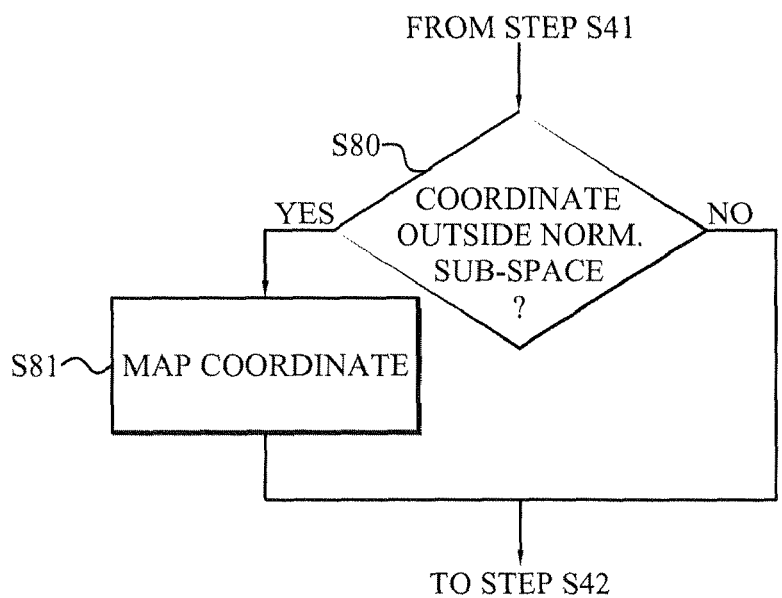
FIG. 19 is a flow diagram illustrating an embodiment of the coordinate providing step of FIG. 16.

FIG. 19 is a flow diagram of a particular embodiment of the providing step S50 of FIG. 16. The method continues from step S41 of FIG. 15. A next step S80 investigates whether the second position-determining coordinate represented by the second codeword is present outside of the normalization sub-region. If instead present inside the normalization sub-region the method continues to step S42 of FIG. 15 where the compressed block is decoded according the auxiliary decoding mode using the first mapped position-determining coordinate and the second position-determining coordinate.

However, if also the second position-determining coordinate is present outside of the normalization sub-region that coordinate is mapped to get a second mapped position-determining coordinate present in the normalization sub-region in step S81. The mapping is preferably performed in a similar manner as the mapping step S41 of FIG. 15. The method then continues to step S42 of FIG. 15 where the compressed block is decoded according to the auxiliary decoding mode using the first and second mapped position-determining coordinates.

As was discussed in connection with the block compression, it is actually possibly to introduce multiple auxiliary compression and decoding modes depending on which position-determining coordinate that is present outside of the normalization sub-region. For instance, a first auxiliary decoding mode is used if the first but not the second position-determining coordinate is present outside of the normalization sub-region. Correspondingly, a second auxiliary decoding mode is selected for compressed blocks in which the second but not the first positioned-determining coordinate is outside the normalization sub-regions. Finally, those blocks having both position-determining coordinates in the region defined as the difference between feature vector space and the normalization sub-region are decoded according to a third auxiliary mode.

The different auxiliary modes can be implemented as previously described in connection with FIG. 17 but then utilizing different distance vectors that are applied to the first and/or second position-determining coordinates. These different distance vectors can have different vector lengths and/or directions.

The present invention is not limited to any particular default and auxiliary modes. As a consequence those modes disclosed herein should merely be seen as illustrative but non-limiting examples of combinations of default and auxiliary compression/decoding modes. In clear contrast, the present invention provides the opportunity of complementing an existing compression/decoding scheme with at least one additional compression/decoding scheme due to the usage of only a normalization sub-region of feature vector space in the existing scheme and then signaling the additional scheme through vector coordinate mirroring.

Decoding Example

A compressed block layout as illustrated in FIG. 10 and a block size as illustrated in FIG. 2 are assumed in this illustrative but non-limiting decoding example.

11101110 00101001 11011111 01011101 110 011 . . . 001 010

The first eight bits corresponds to the X component of the first codeword and the Y component is the third 8-bit sequence:

$$11101110_{bin}=238$$

$$11011111_{bin}=223$$

If a remapping into the interval [−1, 1] is used these values become: 2×238/255−1=0.867 and 2×223/255−1=0.749

The second and fourth 8-bit sequences correspond the second codeword:

$$00101001_{bin}=41$$

$$01011101_{bin}=93$$

These values correspond, when remapping into the interval [−1, 1], to:

$$2\times41/255-1=-0.678 \text{ and } 2\times93/255-1=-0.271$$

It is then investigated whether the coordinate (0.867, 0.749) is present in the normalization sub-region, which in this case is defined as $X^2+Y^2 \leq 1$:

$$0.867^2+0.749^2=1.313>1$$

The same procedure is applied to the second coordinate (−0.678, −0.271):

$$(-0.678)^2+(-0.271)^2=0.533<1$$

This means that the compressed block should be decoded according the auxiliary mode as the first position-determining coordinate (but not the second coordinate) is present outside of the normalization sub-region.

The first coordinate is then, in this example, mirrored relative the line x+y−1=0 (see above with a=1) as the coordinate is in the first quadrant ($0 \leq X \leq 1$, $0 \leq Y \leq 1$). In such a case a point (X, Y) becomes (1−Y, 1−X).

$$(0.867, 0.749) \to (1-0.749, 1-0.867)=(0.251, 0.133)$$

In this case, the auxiliary mode involves adding the following distance vector (0.05; 0) to the mirrored first position-determining coordinate resulting in the two corner coordinates of the parallelogram: (0.301, 0.133) and (−0.678, −0.271).

The normalized representation vectors $\bar{r}_{ij}$ are determined as linear combinations of these two corners as:

$$\bar{r}_{ij} = \left( \frac{7-i}{7} \times (-0.678) + \frac{i}{7} \times 0.301, \frac{7-j}{7}(-0.271) + \frac{j}{7} \times 0.133 \right)$$

where i=0, ..., 7 and j=0, ..., 7.

The first image element has vector indices $i=110_{bin}=6$ and $j=011_{bin}=3$. The 2D normalized representation vector for that image element is, thus: (0.161, −0.098). The Z-coordinate representation for the first image element is then calculated, using equation 1, from these two values: $\sqrt{1-(0.161)^2-(-0.098)^2}=0.992$. Thus, the normal representation for the first image element is (X,Y,Z)=(0.16, −0.10, 0.99).

The same procedure is performed for the other image elements in the block to be decoded.

Implementation Aspects

The block (image) compression and block (image) decompression scheme according to the present invention could be provided in a general data processing system, e.g. in a user terminal or other unit configured for processing and/or rendering images. Such a terminal could be a computer, e.g. PC, a game console or a thin client, such as a Personal Digital Assistance (PDA), mobile unit and telephone.

User Terminal

Figure 20:
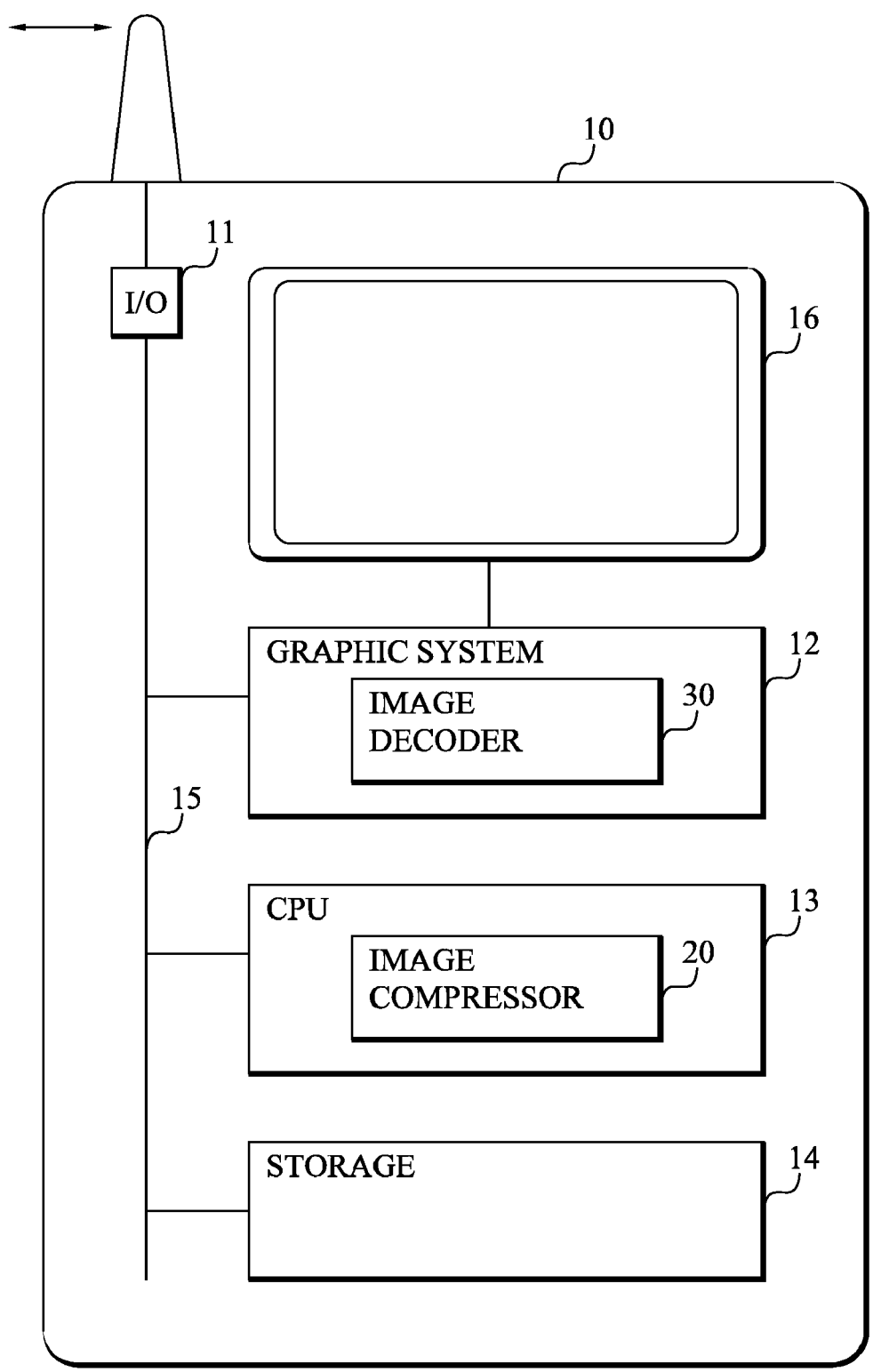
FIG. 20 is block diagram of a user terminal equipped with an image compressor and image decoder according to the present invention.

FIG. 20 illustrates a user terminal 10 represented by a mobile unit. However, the invention is not limited to mobile units but could be implemented in other terminals and data processing units, such as PC computers and game consoles. Only means and elements in the mobile unit 10 directly involved in the present invention are illustrated in the figure.

The mobile unit 10 comprises a (central) processing unit (CPU) 13 for processing data, including image data, within the mobile unit 10. A graphic system 12 is provided in the mobile unit 10 for managing image and graphic data. In particular, the graphic system 12 is adapted for rendering or displaying images on a connected screen 16 or other display unit. The mobile unit 10 also comprises a storage or memory 14 for storing data therein. In this memory 14 image data may be stored, in particular compressed image data according to the present invention.

An image compressor 20 according to the present invention is typically provided in the mobile unit 10. This compressor 20 is configured for compressing an image or texture into a compressed representation of the image. As was discussed above, such a compressed representation comprises a sequence or file of multiple compressed blocks. This image compressor 20 may be provided as software running on the CPU 13, as is illustrated in the figure. Alternatively, or in addition, the compressor 20 could be arranged in the graphic system 12 or elsewhere in the mobile unit 10.

A compressed representation of an image from the block compressor 20 may be provided to the memory 14 over a (memory) bus 15, for storage therein until a subsequent rendering of the image. Alternatively, or in addition, the compressed image data may be forwarded to an input and output (I/O) unit 11 for (wireless or wired) transmission to other external terminals or units. The I/O unit 11 could, for instance, represent the transmitter and receiver chain of the user terminal. The I/O unit 11 can also be adapted for receiving image data from an external unit. This image data could be an image that should be compressed by the image compressor 20 or compressed image data that should be decompressed. It could also be possible to store the compressed image representation in a dedicated texture memory provided, for example, in the graphic system 12. Furthermore, portions of the compressed image could also, or alternatively, be (temporarily) stored in a texture cache memory, e.g. in the graphic system 12.

An image decompressor 30 according to the present invention is typically provided in the mobile unit 10 for decompressing a compressed image in order to generate a decompressed image representation. This decompressed representation could correspond to the whole original image or a portion thereof. The image decompressor 30 provides decompressed image data to the graphic system 12, which in turn typically processes the data before it is rendered or presented on the screen 16. The image decompressor 30 can be arranged in the graphic system 12, as is illustrated in the figure. Alternatively, or in addition, the decoder 30 can be provided as software running on the CPU 13 or elsewhere in the mobile unit 10.

The mobile unit 10 could be equipped with both an image compressor 20 and an image decompressor 30, as is illustrated in the figure. However, for some terminals 10 it could be possible to only include an image compressor 20. In such a case, compressed image data could be transmitted to another terminal that performs the decompression and, possibly, rendering of the image. Correspondingly, a terminal 10 could only include an image decompressor 30, i.e. no compressor. Such a terminal 10 then receives a signal comprising compressed image data from another entity and decompresses it to generate a decompressed image representation. Thus, the compressed image signal could be wirelessly be transmitted between terminals using radio transmitter and receiver. Alternatively, other techniques for distributing images and compressed image representations between terminals according to the invention could be employed, such as BLUETOOTH®, IR-techniques using IR ports and wired transferring of image data between terminals. Also memory cards or chips, including USB memory, which can be connected and exchanged between terminals could be used for this image data inter-terminal distribution.

The units 11, 12, 13, 20 and 30 of the mobile unit 10 may be provided as software, hardware or a combination thereof.

Image Encoder

Figure 21:
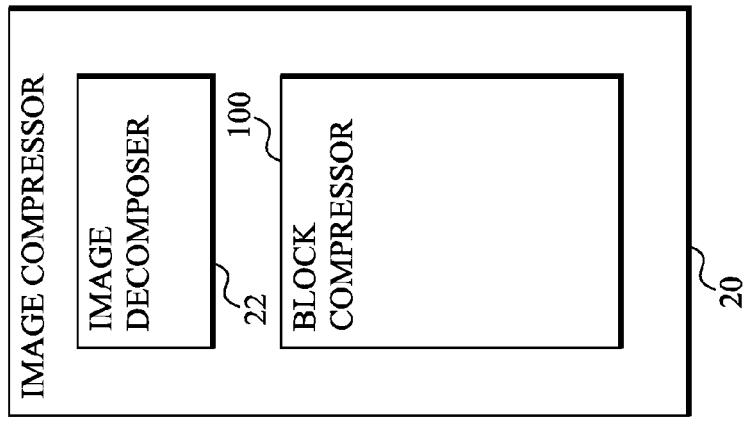
FIG. 21 is a block diagram of an image compressor according to an embodiment of the present invention.

FIG. 21 illustrates a block diagram of an embodiment of an image compressor 20 according to the present invention. The compressor 20 typically comprises an image decomposer 22 for decomposing or dividing an input image into several blocks of multiple image elements. The decomposer 22 is preferably configured for decomposing the image into blocks comprising sixteen image elements (pixels, texels or voxels), i.e. having a general size of 4×4 image elements. This decomposer 22 could be adapted for decomposing different input images into blocks with different sizes. In such a case, the decomposer 22 preferably receives input information, enabling identification of which block format to use for a given image.

This embodiment of the image compressor 20 comprises a block compressor 100. This block compressor 100 compresses the block(s) received from the image decomposer to generate compressed block representation(s). The overall size of the block representation is smaller than the corresponding size of the uncoded block. The block compressor 100 is preferably configured for processing (encoding) each block from the decomposer 22 sequentially.

In an alternative implementation, the compressor 20 includes multiple block compressor 100 for processing multiple blocks from the image decomposer 22 in parallel, which reduces the total image encoding time.

The units 22 and 100 of the image compressor 20 may be provided as software, hardware or a combination thereof. The units 22 and 100 may be implemented together in the image compressor 20. Alternatively, a distributed implementation is also possible with some of the units provided elsewhere in the image processing terminal.

Block Encoder

Figure 22:
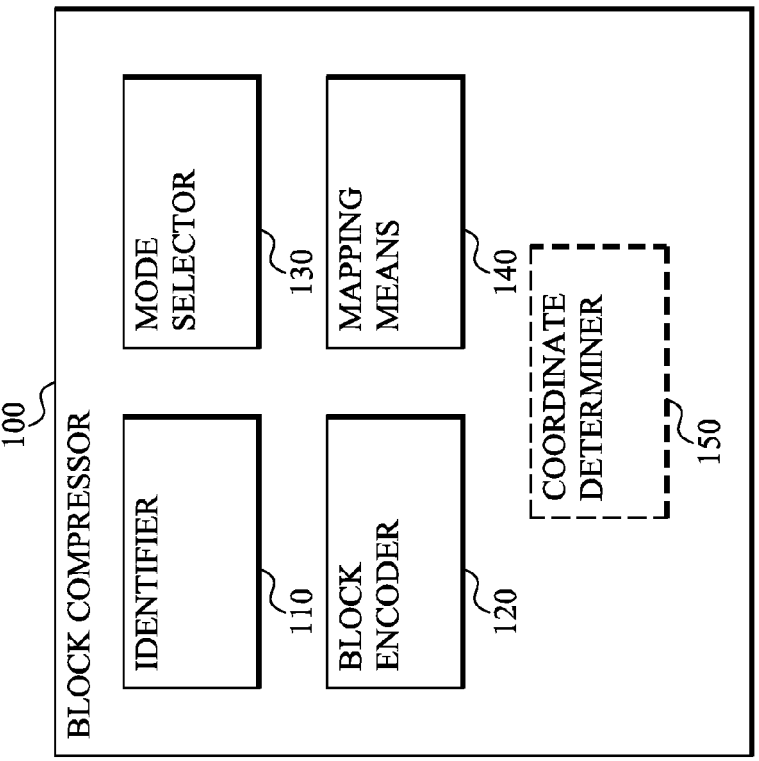
FIG. 22 is a block diagram of a block compressor according to an embodiment of the present invention.

FIG. 22 illustrates a block diagram of an embodiment of a block compressor 100 according to the present invention, such as the block compressor of the image compressor in FIG. 21. The compressor 100 comprises an identifier 110 arranged for identifying a base vector in a normalization sub-region of feature vector space. The identifier 110 uses at least a portion of the normalized feature vectors of a block for identifying the base vector.

A block encoder 120 investigates position-determining coordinate of the base vector to determine if such a position-determining coordinate is present in a defined selection section of the normalization sub-region. In such a case, the block encoder 120 compresses the block according to both a default compression mode to get a default compressed block and an auxiliary compression mode resulting in an auxiliary compressed block. The two modes results in different distributions of normalized representation vectors. The block encoder 120 also determines a respective error estimate representative of the compression error when representing the original block with the default and auxiliary compressed block, respectively.

The compressor 100 comprises a mode selector 130 for selecting a compression mode selects the compression mode and compressed block representation of the default and auxiliary mode/block to use for the present block based on the error representations. The mode selector 130 preferably selects the compression mode resulting in the smallest compression error.

In the case the mode selector 130 selects the auxiliary mode, a mapping means or unit 140 maps or transforms, such as mirrors, the position-determining coordinate to a mapped selection section positioned outside of the normalization sub-region.

The final compressed block comprises a first codeword representing the mapped position-determining coordinate (if compressed according to auxiliary mode) or the position-determining coordinate (if compressed according to the default mode). The compressed block also optionally but preferably comprises a second codeword representing a second position-determining coordinate of a bounding section if the base vector and the first defines a first position-determining coordinate of the bounding section. The compressed block further preferably has a sequence of vector identifiers, each being associated with a normalized representation vector obtained from the first (mapped) and the second position-determining coordinates and assigned to an image element of the block.

In case the position-determining coordinate of the base vector is not present in the defined selection section the block encoder compresses the block according to the default mode and the auxiliary mode is not available.

The bounding section is preferably a parallelogram and more preferably an axis-aligned right-angled parallelogram. In such a case, a coordinate determiner 150 of the block compressor 100 could optionally be implemented to determine whether a corner coordinate (corresponds to position-determining coordinate) of the parallelogram is present in the defined selection section.

The units 110 to 150 of the block compressor 100 may be provided as software, hardware or a combination thereof. The units 110 to 150 may be implemented together in the block compressor 100. Alternatively, a distributed implementation is also possible with some of the units provided elsewhere in the image compressor.

Figure 23:
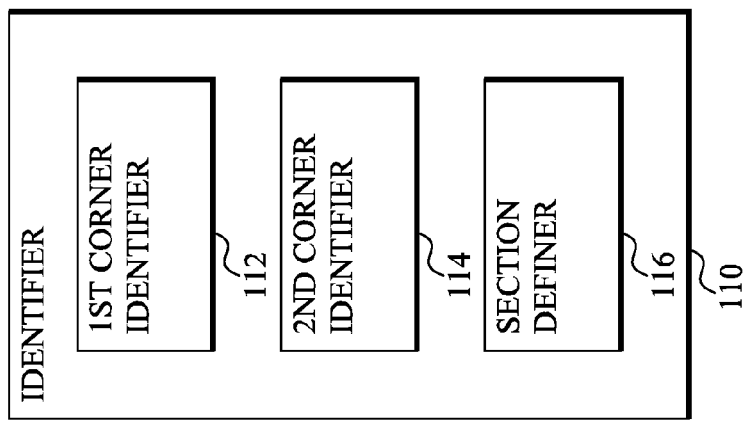
FIG. 23 is a block diagram of an embodiment of the section identifier of FIG. 22.

FIG. 23 is a schematic block diagram of an embodiment of the identifier 110 of FIG. 22. The identifier 110 comprises a first corner identifier 112 arranged for identifying a smallest first and a smallest second vector component of the normalized feature vectors in the block. A corresponding second corner identifier 114 identifies a largest first and a largest second vector component of the normalized feature vectors. The section identifier 110 comprises a section definer 116 for defining the bounding section based on the identified smallest and largest first and second vector components.

In a preferred embodiment the section definer 116 defines a parallelogram with a first corner being equal to the smallest vector components from the first corner identifier 112 and a second diagonally opposite corner equal to the largest vector components from the second corner identifier 114.

The units 112 to 116 of the section identifier 110 may be provided as software, hardware or a combination thereof. The units 112 to 116 may be implemented together in the section identifier 110. Alternatively, a distributed implementation is also possible with some of the units provided elsewhere in the block compressor.

Figure 24:
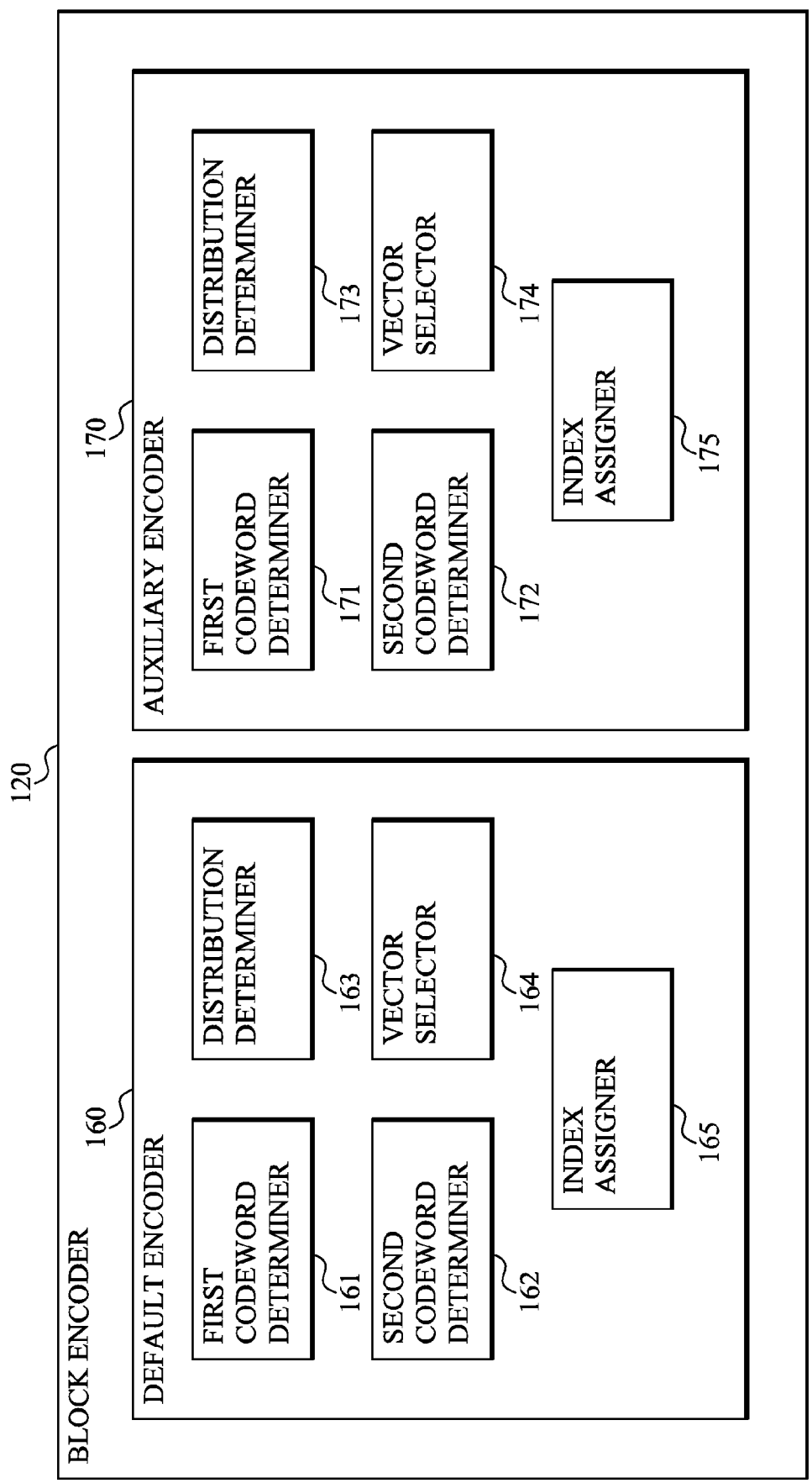
FIG. 24 is a block diagram of an embodiment of the block encoder of FIG. 22.

FIG. 24 is a schematic block diagram of a particular embodiment of the block encoder 120 of the block compressor in FIG. 22. The block encoder 120 comprises a default encoder 160 compressing or encoding a block according to the default mode and an auxiliary encoder 170 operating according the auxiliary compression/encoding mode.

The default encoder 160 comprises a first codeword determiner 161 for determining a first codeword as a representation of the first position-determining coordinate of the bounding section. A second codeword determiner 162 determines a second codeword as representation of the second position-determining coordinate. The two codeword determines 161, 162 utilize at least a portion of the normalized feature vectors in the block in the codeword determination.

A distribution determiner 163 uses the two codewords or the two position-determining coordinates for the purpose of determining a first distribution of multiple normalized representation vectors. The determiner 163 preferably calculates the vectors as different linear combinations of two position-determining coordinates.

A vector selector 164 is implemented in the default encoder 160 for selecting, for at least one image element in the block, a vector among the multiple normalized representation vectors from the distribution determiner 163. The selector 164 furthermore performs the selection based on the feature vector of the image element by preferably selecting the vector resulting in a smallest vector length of a difference vector between the feature vector and a vector among the normalized representation vectors.

The default encoder 160 comprises an identifier or index assigner 165 arranged for assigning a vector identifier to the processed image element. This vector identifier is furthermore associated with and allows identification of the vector selected by the vector selector 164. The vector selector 164 and the identifier assigner 165 preferably selects vector and assigns vector identifier for each image element in the block to thereby obtain a compressed representation of the compressed block comprising the two codewords from the codeword determiners 161, 62 and a sequence of vector identifiers. In a preferred embodiment, the identifier assigner 165 assigns vector identifiers comprising two identifier components each as is illustrated in FIG. 10 and discussed in the foregoing.

The auxiliary encoder 170 comprises, in a particular embodiment, a first codeword determiner 171 arranged for determining a first codeword as a representation of a first mapped position-determining coordinate. The determiner 171 determines a first position-determining coordinate of the bounding section based on at least a portion of the normalized feature vectors in the block. This determination is performed similar to the operation of the first codeword determiner of the default encoder. However, the codeword determiner 171 then maps the first position-determining coordinate to get the first mapped coordinate present outside of the normalization sub-region of feature vector space.

A second codeword determiner 172 is arranged in the auxiliary encoder 170. The operation of this determiner 172 is similar to the second codeword determiner of the default encoder and is not further discussed herein.

A distribution determiner 173 of the encoder 170 determines a second distribution of multiple normalized representation vectors based on linear combinations of the first and second position-determining coordinates and a pre-defined distance vector.

The auxiliary encoder 170 also comprises a vector selector 174 that selects, for an image element in the block, a vector among the second distribution of multiple normalization vectors. An index assigner 175 assigns, to the image element, a vector index or identifier associated with the selected vector. The operation of the selector 174 and the assigner 175 are substantially the same as the corresponding selector and assigner of the default encoder.

The block encoder 120 can alternatively include multiple different auxiliary encoders 170 or the auxiliary encoder can generate different compressed blocks of a given block by compressing the block according to different auxiliary modes as previously described.

The units 160-165 and 170-175 of the block encoder 120 may be provided as software, hardware or a combination thereof. The units 160-165 and 170-175 may be implemented together in the block encoder 120. Alternatively, a distributed implementation is also possible with some of the units provided elsewhere in the block compressor.

In an alternative embodiment the default and auxiliary encoder comprises a respective codeword determiner for determining vector representations of multiple base vectors. The encoders also comprise a vector order selector for selecting, in the case of at least four determined base vectors, a base vector order. A respective additional vector determiner determines, for at least one pair of neighboring vectors as defined by the selected vector order, at least one additional vector. The auxiliary encoder, however, uses a predefined distance vector that is applied to at least one of the base vectors before determining any additional vectors. Vector selectors are provided for selecting a vector among the base and additional vectors as representation of the respective feature vectors in the block. The index assigners assign vector indices to the image elements based on the selected vectors.

Image Decoder

Figure 25:
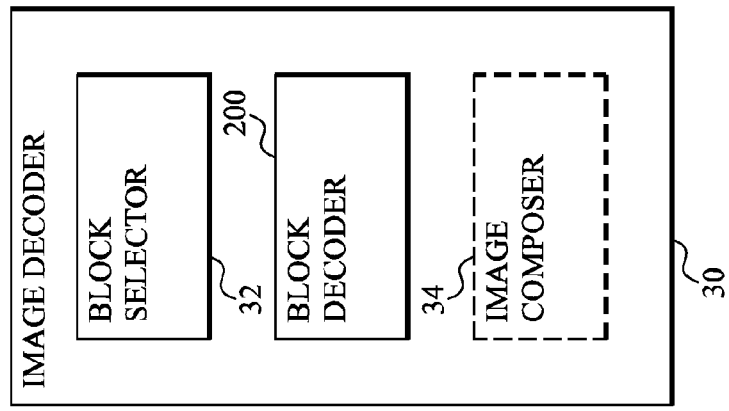
FIG. 25 is a block diagram of an image decoder according to an embodiment of the present invention.

FIG. 25 illustrates a block diagram of an embodiment of an image decompressor 30 according to the present invention. The image decompressor 30 preferably comprises a block selector 32 that is adapted for selecting, e.g. from a memory, which encoded block(s) that should be provided to a block decompressor 200 for decompression. The block selector 32 preferably receives input information associated with the compressed image data, e.g. from a header or a rendering engine. An address of a compressed block having the desired image element(s) is then computed based on the input information. This computed address is preferably dependent upon the image-element (pixel, texel or voxel) coordinates within an image. Using the address, the block selector 32 identifies the compressed block from the memory. This identified compressed image block is then fetched from the storage and provided to the block decompressor 200.

The (random) access to image elements of an image block advantageously enables selective decompression of only those portions of an image that are needed. Furthermore, the image can be decompressed in any order the data is required. For example, in texture mapping only portions of the texture may be required and these portions will generally be required in a non-sequential order. Thus, the image decompression of the present invention can with advantage by applied to process only a portion or section of an image.

The selected compressed block is then forwarded to the block decompressor 200. In addition to the image block, the decompressor 200 preferably receives information specifying which image elements of the block that should be decoded. The information could specify that the whole image block, i.e. all image elements therein, should be decoded. However, the received information could identify only a single or a few of the image elements that should be decoded. The block decompressor 200 then generates a decompressed representation of the image element(s) in the block.

An optional image composer 34 could be provided in the image decompressor 30. This composer receives the decoded image elements from the block decompressor 200 and composes them to generate a pixel that can be rendered or displayed on a screen. This image composer 34 could alternatively be provided in the graphic system.

Alternatively, the image decompressor 30 comprises multiple block decompressors 200. By having access to multiple block decompressors 200, the image decoder 30 can process multiple encoded image blocks in parallel. These multiple block decompressors 200 allow for parallel processing that increases the processing performance and efficiency of the image decompressor 30.

Figure 26:
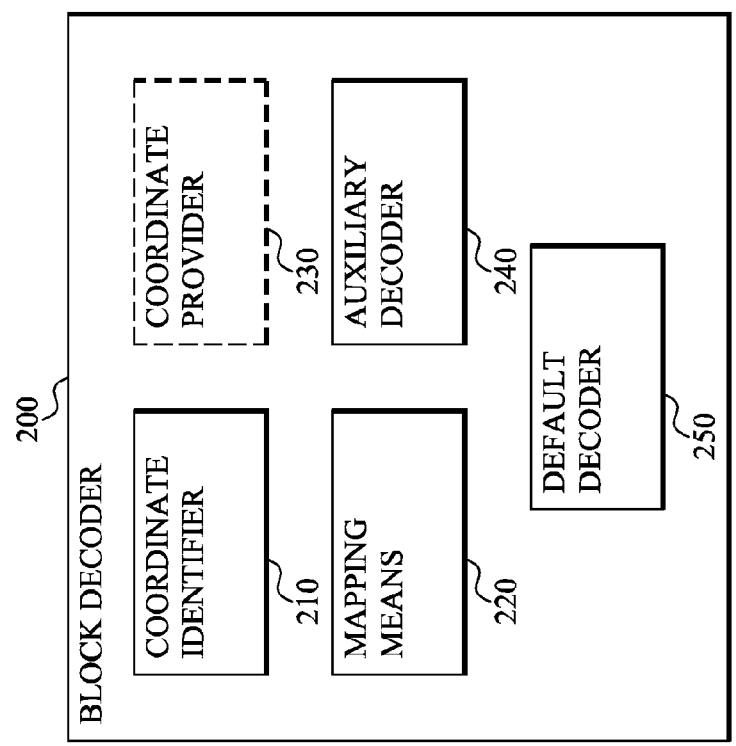
FIG. 26 is a block diagram of a block decoder according to an embodiment of the present invention.

The units 32, 34 and 200 of the image decompressor 30 may be provided as software, hardware or a combination thereof. The units 32, 34 and 200 may be implemented together in the image decompressor 30. Alternatively, a distributed implementation is also possible with some of the units provided elsewhere in the user terminal.

Block Decoder FIG. 26 is an illustration of an embodiment of a block decompressor or decoder 200 according to the present invention. The block decoder 200 comprises a coordinate identifier 210 for investigating whether a first codeword of the compressed block represents a first position-determining coordinate present inside or outside of a normalization sub-region of feature vector space. If the position-determining coordinate is present outside of the normalization space, a mapping means or unit 220 maps the position-determining coordinate to get a first mapped position-determining coordinate present in the normalization sub-region.

If the first position-determining coordinate was present in the normalization sub-region, a default decoder 250 decodes the compressed block based on the first position-determining coordinates. The default decoder 250 uses the coordinate for determining a respective normalized representation vector as decoded representation of the normalized feature vector of each image element to be decoded of the block.

However, if first position-determining coordinate was outside of the normalization sub-region, an auxiliary decoder 240 instead processes the compressed block. This decoder 240 generates, for each image element in the block to be decoded, a respective normalized representation vector based on the first mapped position-determining coordinate from the mapping means 220.

The block decoder 200 optionally but preferably also comprises a coordinate provider 230 for providing a second position-determining coordinate present in the normalization sub-region based on a second codeword of the compressed block. In such a case the default decoder 250 generates a normalized representation vector based on the first and second position-determining coordinates while the auxiliary decoder 240 generates such a normalized representation vector based on the first mapped position-determining coordinate and the second position-determining coordinate.

The units 210 to 250 of the block decoder 200 may be provided as software, hardware or a combination thereof. The units 210 to 250 may be implemented together in the block decoder 200. Alternatively, a distributed implementation is also possible with some of the units provided elsewhere in the image decompressor.

Figure 27:
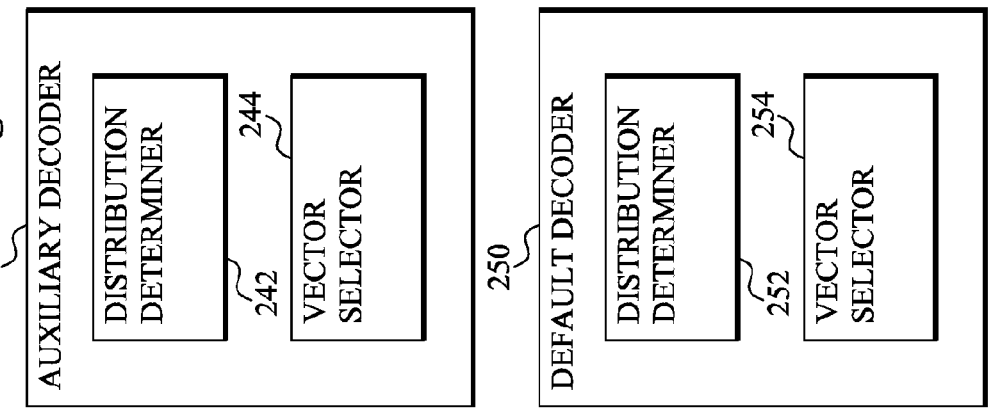
FIG. 27 is a block diagram of an embodiment of the auxiliary decoder of FIG. 26.

FIG. 27 is a schematic block diagram of an embodiment of the auxiliary decoder 240 of FIG. 26. The decoder comprises a distribution determiner 242 arranged for determining a second distribution of multiple normalized representation vectors based on the first mapped position-determining coordinate and the second position-determining coordinate.

A vector selector 244 then selects which vector among the multiple vectors of the second distribution that is used as decoded representation of the original feature vector of an image element in the current block. This selection is performed based on a vector identifier included in the compressed block and associated with the image element.

The units 242 and 244 of the auxiliary decoder 240 may be provided as software, hardware or a combination thereof. The units 242 and 244 may be implemented together in the auxiliary decoder 240. Alternatively, a distributed implementation is also possible with some of the units provided elsewhere in the block decoder.

Figure 28:
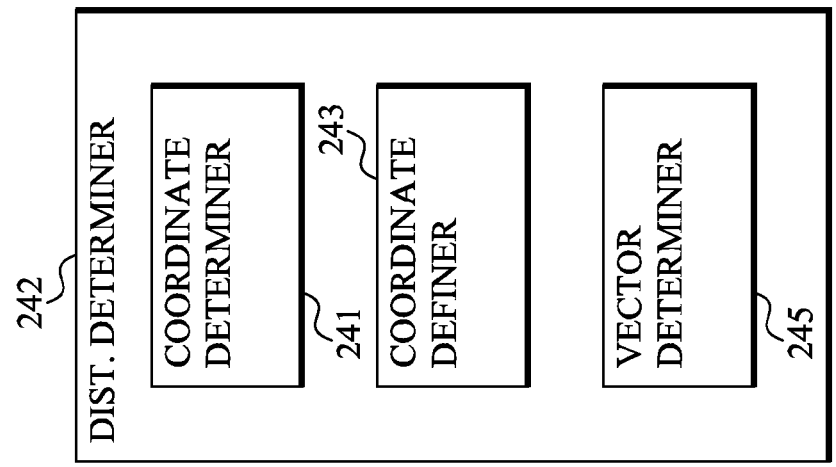
FIG. 28 is a block diagram of an embodiment of the distribution determiner of FIG. 27.

FIG. 28 is a schematic block diagram of an embodiment of the distribution determiner 242 of FIG. 27. The distribution determiner 242 comprises a coordinate determiner 241 arranged for determining a first corner coordinate of a parallelogram in feature vector space based on the first mapped position-determining coordinate and a distance vector as previously described. A coordinate definer 243 uses the second position-determining coordinate for defining a second, preferably diagonally opposite, corner of the parallelogram. A vector determiner 245 determines the multiple normalized representation vectors of the second distribution as different linear combinations of the two corner coordinates.

The units 241, 243 and 245 of the distribution determiner 242 may be provided as software, hardware or a combination thereof. The units 241, 243 and 245 may be implemented together in the distribution determiner 242. Alternatively, a distributed implementation is also possible with some of the units provided elsewhere in the auxiliary decoder.

Figure 29:
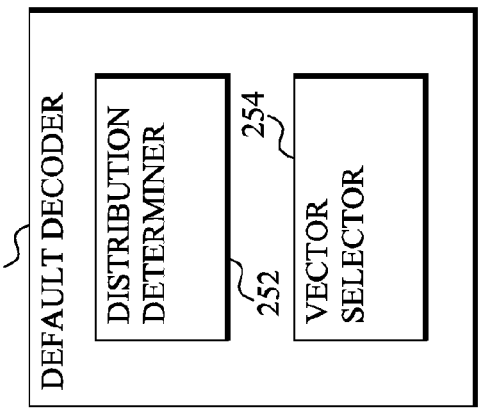
FIG. 29 is a block diagram of an embodiment of the default decoder of FIG. 26.

FIG. 29 is a schematic block diagram of an embodiment of the default decoder 250 of FIG. 26. The decoder comprises a distribution determiner 252 arranged for determining a first distribution of multiple normalized representation vectors based on the first position-determining coordinate and the second position-determining coordinate.

A vector selector 254 then selects which vector among the multiple vectors of the first distribution that is used as decoded representation of the original feature vector of an image element in the current block. This selection is performed based on a vector identifier included in the compressed block and associated with the image element.

The units 252 and 254 of the default decoder 250 may be provided as software, hardware or a combination thereof. The units 252 and 254 may be implemented together in the auxiliary decoder 250. Alternatively, a distributed implementation is also possible with some of the units provided elsewhere in the block decoder.

Figure 30:
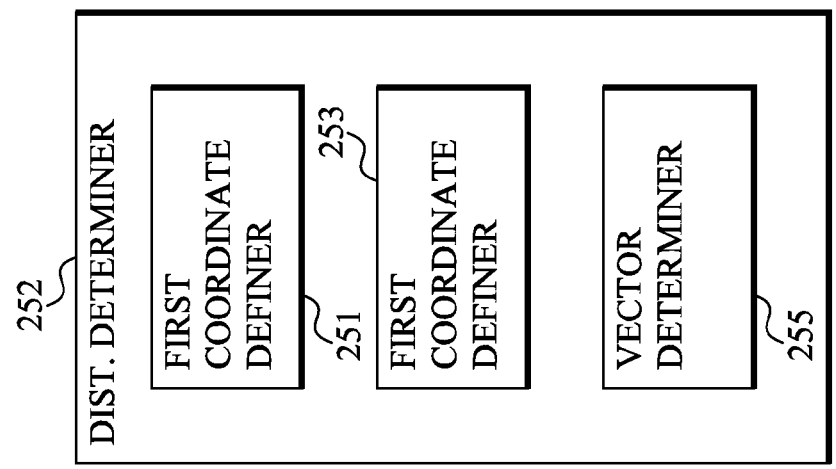
FIG. 30 is a block diagram of an embodiment of the distribution determiner of FIG. 29.

FIG. 30 is a schematic block diagram of an embodiment of the distribution determiner 252 of FIG. 29. The distribution determiner 252 comprises a first coordinate definer 251 arranged for defining a first corner coordinate of a parallelogram in feature vector space based on the first position-determining coordinate. A second coordinate definer 253 uses the second position-determining coordinate for defining a second, preferably diagonally opposite, corner of the parallelogram. A vector determiner 255 determines the multiple normalized representation vectors of the first distribution as different linear combinations of the two corner coordinates.

The units 251, 253 and 255 of the distribution determiner 252 may be provided as software, hardware or a combination thereof. The units 251, 253 and 255 may be implemented together in the distribution determiner 252. Alternatively, a distributed implementation is also possible with some of the units provided elsewhere in the default decoder.

Figure 31:
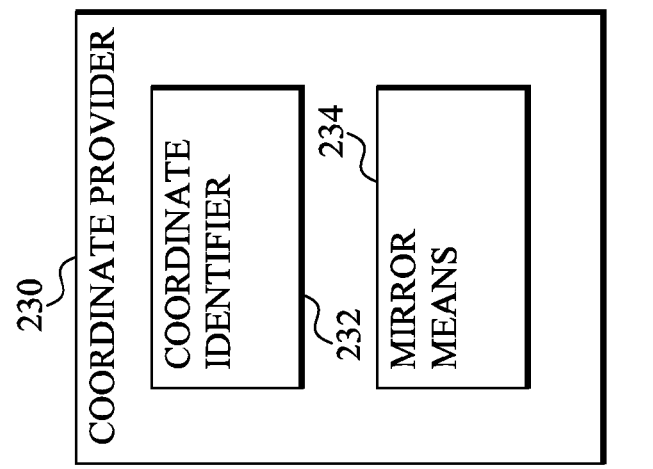
FIG. 31 is a block diagram of an embodiment of the coordinate provider of FIG. 26.

FIG. 31 illustrates a particular embodiment of the coordinate provider 230 of the default decoder in FIG. 26. The coordinate provider 230 comprises coordinate identifier 232 arranged for investigating whether the second position-determining coordinate is present in or outside of the normalization sub-region of feature vector space. In the latter case, a mapping means or unit 234 maps the second position-determining coordinate to get a second mapped position-determining coordinate present inside the normalization sub-region. In such a case, the auxiliary mode decoder utilizes this mapped coordinate in the calculation of the normalized representation vectors for the block.

The units 232 and 234 of the coordinate provider 230 may be provided as software, hardware or a combination thereof. The units 232 and 234 may be implemented together in the coordinate provider 230. Alternatively, a distributed implementation is also possible with some of the units provided elsewhere in the block decoder.

In the foregoing, the present invention has been described with reference of processing image blocks having normalized normals as feature vectors. In an alternative implementation, the feature vectors could be a normalized color vector in a color space, such as RGB (red, green, blue) space. Also other image element features that are representable as feature vectors in a feature vector space can be processed according to the present invention.

It will be understood by a person skilled in the art that various modifications and changes may be made to the present invention without departure from the scope thereof, which is defined by the appended claims.

REFERENCES

[1] http://www.ati.com/products/radeonx800/3DcWhitePaper.pdf ATI™ Radeon™ X800 3Dc™ White Paper
[2] U.S. Pat. No. 5,956,431

The invention claimed is:

1. A method of compressing a block of image elements, each image element having an associated normalized feature vector present in a normalization sub-region of a vector feature space, said method comprising the steps of:
   identifying, based on at least a portion of said normalized feature vectors, a base vector in said normalization sub-region;
   coding, if a position-determining coordinate of said base vector is present in a defined selection section of said feature vector space, at least one image element of said block according to a default compression mode and an auxiliary compression mode;
   selecting the compression mode of said default compression mode and said auxiliary compression mode based on a default compression mode error and an auxiliary compression mode error; and
   mapping, if said selected compression mode is said auxiliary compression mode, said position-determining coordinate to get a mapped position-determining coordinate present in a mapped selection section positioned outside of said normalization sub-region, wherein a compressed representation of said block comprises a representation of said mapped position-determining coordinate if said selected compression mode is said auxiliary compression mode and a representation of said position-determining coordinate if said selected compression mode is said default compression mode.

2. The method according to claim 1, wherein said defined selection section is defined as a difference of said feature vector space and said normalization subregion mapped into said normalization sub-region.

3. The method according to claim 2, wherein said difference of said feature vector space and said normalization sub-region is mirrored relative a mirror line defined as:

$$X+y-a=0 \quad 0\leq x\leq a,\ 0\leq y\leq a$$

$$-x+y-a=0 \quad -a\leq x\leq 0,\ 0\leq y\leq a$$

$$-x-y-a=0 \quad -a\leq x\leq 0,\ -a\leq y\leq 0$$

$$X-y-a=0 \quad 0\leq x\leq a,\ -a\leq y\leq 0$$

where said normalized feature vectors and said normalized representation vectors are two dimensional vectors having a first vector component x and a second vector component y and a is the maximum normalized value of said vector components.

4. The method according to claim 1, wherein said normalized feature vectors and said normalized representation vectors are two dimensional vectors having a first vector component x and a second vector component y and said defined selection section of said feature vector space is defined by:

$$(x+a)^2+(y-a)^2>a^2 \quad 0\leq x\leq a,\ 0\leq y\leq a$$

$$(x+a)^2+(y-a)^2>a^2 \quad -a\leq x\leq 0,\ 0\leq y\leq a$$

$$(x+a)^2+(y+a)^2>a^2 \quad -a\leq x\leq 0,\ -a\leq y\leq 0$$

$$(x-a)^2+(y+a)^2>a^2 \quad 0\leq x\leq a,\ -a\leq y\leq 0$$

where a is the maximum normalized value of said vector components.

5. The method according to claim 1 wherein said mapping step comprises mirroring, if said selected compression mode is said auxiliary compression mode, said first position-determining coordinate relative a mirror line defined as:

$$X+y-a=0 \quad 0\leq x\leq a,\ 0\leq y\leq a$$

$$-x+y-a=0 \quad -a\leq x\leq 0,\ 0\leq y-a$$

$$-x-y-a=0 \quad -a\leq x\leq 0,\ -a\leq y\leq 0$$

$$X-y-a=0 \quad 0\leq x\leq a,\ -a\leq y\leq 0$$

where x is a first vector coordinate, y is a second vector coordinate and a is the maximum normalized value of said vector components, to get a mirrored position-determining coordinate present in said mirrored selection section positioned outside of said normalization sub-region.

6. The method according to claim 1, wherein said identifying step comprises the steps of:
   defining, based on said at least a portion of said normalized feature vectors, a bounding section in said normalization sub-region intended for encompassing multiple normalized representation vectors employed for representing said normalized feature vectors; and
   identifying said base vector as pointing towards a first position-determining coordinate of said bounding section, wherein said bounding section encompasses a first distribution of multiple normalized representation vectors when utilizing said default compression mode and encompasses a second different distribution of multiple normalized representation vectors when utilizing said auxiliary compression mode.

7. The method according to claim 1, wherein said step of coding said block according to said default compression mode comprises the steps of:
   determining, based on at least a portion of said normalized feature vectors, a first codeword as a representation of said first position-determining coordinate;
   determining, based on at least a portion of said normalized feature vectors, a second codeword as a representation of a second position-determining coordinate of said bounding section;
   determining a first distribution of said multiple normalized representation vectors based on linear combinations of said first and second position-determining coordinates;
   selecting, for at least one image element in said block, a normalized representation vector of said first distribution as representation of a normalized feature vector associated with said at least one image element; and
   assigning, to said at least one image element, a vector index associated with said selected normalized representation vector.

8. The method according to claim any of the claim 1, wherein said step of coding said block according to said auxiliary compression mode comprises the steps of:
- determining, based on at least a portion of said normalized feature vectors, a first codeword as a representation of said first mapped position-determining coordinate;
- determining, based on at least a portion of said feature vectors, a second codeword as a representation of a second position-determining coordinate of said bounding section;
- determining a second distribution of said multiple normalized representation vectors based on linear combinations of said first position-determining coordinate plus a distance vector and said second position-determining coordinate;
- selecting, for at least one image element in said block, a normalized representation vector of said second distribution as representation of a normalized feature vector associated with said at least one image element; and
- assigning, to said at least one image element, a vector index associated with said selected normalized representation vector.

9. A method of decoding a normalized feature vector representing an image feature of an image element from a compressed block, said method comprising the steps of:
- identifying whether a first codeword of said compressed block represents a first position-determining coordinate present outside of a normalization sub-region of feature vector space;
- mapping, if said first position-determining coordinate is present outside of said normalization sub-region, said first position-determining coordinate to get a first mapped position-determining coordinate present in said normalization sub-region;
- decoding said compressed block according to an auxiliary decoding mode based on said first mapped position-determining coordinate to get a normalized representation vector as decoded representation of said normalized feature vector.

10. The method according to claim 9, further comprising providing, based on a second codeword of said compressed block, a second position-determining coordinate present in said normalization sub-region, wherein said decoding step comprises decoding said compressed block according to said auxiliary decoding mode based on said first mapped position-determining coordinate and said second position-determining coordinate to get said normalized representation vector as decoded representation of said normalized feature vector.

11. The method according to claim 9, wherein said step of decoding said compressed block according to said auxiliary decoding mode comprises the steps of:
- determining a second distribution of multiple normalized representation vectors based on said first mapped position-determining coordinate and said second position-determining coordinate; and
- selecting a normalized representation vector of said second distribution as representation of said normalized feature vector based on a vector index associated with said image element and comprised in said compressed block.

12. The method according to claim 9, further comprising decoding, if said first position-determining coordinate is present in said normalization sub-region, said compressed block according to a default decoding mode based on said first position-determining coordinate to get a normalized representation vector as decoded representation of said normalized feature vector.

13. The method according to claim 12, wherein said step of decoding said compressed block according to said default decoding mode comprises the steps of:
- determining a first distribution of multiple normalized representation vectors based on said first position-determining coordinate and said second position-determining coordinate; and
- selecting a normalized representation vector of said first distribution as representation of said normalized feature vector based on a vector index associated with said image element and comprised in said compressed block.

14. The method according to claim 9, wherein said providing step comprises the steps of:
- identifying whether said second position-determining coordinate represented by said second codeword is present outside of said normalization sub-region; and
- mapping, if said second position-determining coordinate is present outside of said normalization sub-region, said second position-determining coordinate to get a second mapped position-determining coordinate present in said normalization sub-region, said decoding step comprises decoding said compressed block according to said auxiliary decoding mode based on said first mapped position-determining coordinate and said second mapped position-determining coordinate to get said normalized representation vector as decoded' representation of said normalized feature vector.

15. A compressor for compressing a block of image elements, each image element having an associated normalized feature vector present in a normalization sub-region of vector feature space, said compressor comprising:
- an identifier for identifying, based on at least a portion of said normalized feature vectors, a base vector in said normalization sub-region;
- an encoder for coding, if a position-determining coordinate of said base vector is present in a defined selection section of said feature vector space, at least one image element of said block according to a default compression mode and an auxiliary mode;
- a mode selector for selecting the compression mode of said default compression mode and said auxiliary compression mode based on a default compression mode error and an auxiliary compression mode error; and
- a mapping means for mapping, if said mode selector selects said auxiliary compression mode as selected compression mode, said position-determining coordinate to get a mapped position-determining coordinate present in a mapped selection section positioned outside of said normalization sub-region, wherein a compressed representation of said block comprises a representation of said mapped position-determining coordinate if said selected compression mode is said auxiliary compression mode and a representation of said position-determining coordinate if said selected compression mode is said, default compression mod.

16. The compressor according to claim 15, wherein said identifier comprises:
- a section definer for defining, based on said at least a portion of said normalized feature vectors, a bounding section in said normalization sub-region intended for encompassing multiple normalized representation vectors employed for representing said normalized feature vectors; and
- an identifier for identifying said base vector as pointing towards a first position-determining coordinate of said bounding section, wherein said bounding section encompasses a first distribution of multiple normalized representation vectors when said encoder encodes according to said default compression mode and encompasses a second different distribution of multiple normalized representation vectors when said encoder encodes according to said auxiliary compression mode.

17. The compressor according to claim 15, wherein said encoder comprises a default mode encoder in turn comprising:
   a first codeword determiner for determining, based on at least a portion of said normalized feature vectors, a first codeword as a representation of said first position-determining coordinate;
   a second codeword determiner for determining, based on at least a portion of said normalized feature vectors, a second codeword as a representation of a second position-determining coordinate of said bounding section;
   a distribution determiner for determining a first distribution of said multiple normalized representation vectors based on linear combinations of said first and second position-determining coordinates;
   a vector selector for selecting, for at least one image element in said block, a normalized representation vector of said first distribution as representation of a normalized feature vector associated with said at least one image element; and
   an index assigner for assigning, to said at least one image element, a vector index associated with said normalized representation vector selected by said vector selector.

18. The compressor according to claim 15, wherein said encoder comprises an auxiliary mode encoder in turn comprising:
   a first determiner for determining, based on at least a portion of said normalized feature vectors, a first codeword as a representation of said first mirrored position-determining coordinate;
   a second determiner for determining, based on at least a portion of said normalized feature vectors, a second codeword as a representation of a second position-determining coordinate of said bounding section;
   a distribution determiner for determining a second distribution of said multiple normalized representation vectors based on linear combinations of said first position-determining coordinate plus a distance vector and said second position-determining coordinate;
   a vector selector for selecting, for at least one image element in said block, a normalized representation vector of said second distribution as representation of a normalized feature vector associated with said at least one image element; and
   an index assigner for assigning, to said at least one image element, a vector index associated with said normalized representation vector selected by said vector selector.

19. A decoder for decoding a normalized feature vector representing an image feature of an image element from a compressed block, said decoder comprising:
   a coordinate identifier for identifying whether a first codeword of said compressed block represents a first position-determining coordinate present outside of a normalization sub-region of feature vector space;
   a mapping means for mirroring, if said first position-determining coordinate is present outside of said normalization sub-region, said first position-determining coordinate to get a first mapped position-determining coordinate present in said normalization sub-region;
   an auxiliary mode decoder for decoding said compressed block according to an auxiliary decoding mode based on said first mapped position-determining coordinate to get a normalized representation vector as decoded representation of said normalized feature vector.

20. The decoder according to claim 19, further comprising a coordinate provider for providing, based on a second codeword of said compressed block, a second position-determining coordinate present in said normalization subregion, wherein said auxiliary mode decoder is arranged for decoding said compressed block according to said auxiliary decoding mode based on said first mapped position-determining coordinate and said second position-determining coordinate to get said normalized representation vector as decoded representation of said normalized feature vector.

21. The decoder according to claim 19, wherein said auxiliary mode decoder comprises:
   a distribution determiner for determining a second distribution of multiple normalized representation vectors based on said first mapped position-determining coordinate and said second position-determining coordinate; and
   a vector selector selecting a normalized representation vector of said second distribution as representation of said normalized feature vector based on a vector index associated with said image element and comprised in said compressed block.

22. The decoder according to claim 19, further comprising a default mode decoder for decoding, if said first position-determining coordinate is present in said normalization sub-region, said compressed block according to a default decoding mode based on said first position-determining coordinate to get a normalized representation vector as decoded representation of said normalized feature vector.

23. The decoder according to claim 22, wherein said default mode decoder comprises:
   a distribution determiner for determining a first distribution of multiple normalized representation vectors based on said first position-determining coordinate and said second position-determining coordinate; and
   a vector selector for selecting a normalized representation vector of said second distribution as representation of said normalized feature vector based on a vector index associated with said image element and comprised in said compressed block.

24. The decoder according to claim 19, wherein said coordinate provider comprises:
   a coordinate identifier for identifying whether said second position-determining coordinate represented by said second codeword is present outside of said normalization sub-region; and
   a mapping means for mapping, if said second position-determining coordinate is present outside of said normalization sub-region, said second position-determining coordinate to get a second mapped position-determining coordinate present in said normalization sub-region, said auxiliary mode decoder is arranged for decoding said compressed block according to said auxiliary decoding mode based on said first mapped position-determining coordinate and said second mapped position-determining coordinate to get said normalized representation vector as decoded representation of said normalized feature vector.

* * * * *